(12) United States Patent
Fujita et al.

(10) Patent No.: US 9,723,234 B2
(45) Date of Patent: Aug. 1, 2017

(54) SOLID-STATE IMAGING DEVICE, SOLID-STATE IMAGING METHOD, AND ELECTRONIC APPARATUS

(71) Applicant: Sony Corporation, Tokyo (JP)

(72) Inventors: Kazuhide Fujita, Kanagawa (JP); Kentaro Okamura, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 15/171,454

(22) Filed: Jun. 2, 2016

(65) Prior Publication Data

US 2016/0277693 A1 Sep. 22, 2016

Related U.S. Application Data

(63) Continuation of application No. 14/323,532, filed on Jul. 3, 2014, now Pat. No. 9,386,245.

(30) Foreign Application Priority Data

Jul. 11, 2013 (JP) ................................ 2013-145913

(51) Int. Cl.
*H04N 5/367* (2011.01)
*H04N 5/217* (2011.01)
*H04N 5/235* (2006.01)
*H04N 5/355* (2011.01)

(52) U.S. Cl.
CPC .......... *H04N 5/367* (2013.01); *H04N 5/2173* (2013.01); *H04N 5/2355* (2013.01); *H04N 5/35554* (2013.01)

(58) Field of Classification Search
CPC ..................................................... H04N 5/367
See application file for complete search history.

(56) References Cited

U.S. PATENT DOCUMENTS

| | | | |
|---|---|---|---|
| 2008/0291296 A1* | 11/2008 | Oike | H04N 5/3591 348/234 |
| 2014/0211048 A1* | 7/2014 | Kolli | H04N 5/3675 348/246 |

\* cited by examiner

*Primary Examiner* — James Hannett
(74) *Attorney, Agent, or Firm* — Sheridan Ross P.C.

(57) ABSTRACT

A solid-state imaging device includes a pixel array and a pixel value correcting unit. The pixel array includes a plurality of pixels, the plurality of pixels each having one of a different exposure time and a different exposure sensitivity and being disposed according to a predetermined rule. The pixel value correcting unit is configured to correct, among pixel values obtained from the plurality of pixels in the pixel array, a pixel value of a pixel of the plurality of pixels that applies to a preset condition, by using a pixel value of another pixel of the plurality of pixels.

16 Claims, 28 Drawing Sheets

Horizontal

Vertical

+45°

−45°

☐ Long-time exposure pixel
▨ Short-time exposure pixel (before gain correction)

Horizontal

Vertical

+45°

−45°

Pixel of interest

Long-time exposure pixel

Short-time exposure pixel (after gain correction)

Horizontal

Vertical

+45°

−45°

Long-time exposure pixel

Short-time exposure pixel (before gain correction)

SOLID-STATE IMAGING DEVICE, SOLID-STATE IMAGING METHOD, AND ELECTRONIC APPARATUS

CROSS REFERENCE TO RELATED APPLICATIONS

This application is a continuation of U.S. patent application Ser. No. 14/323,532, filed Jul. 3, 2014, which claims the benefit of Japanese Patent Application No. JP 2013-145913, filed Jul. 11, 2013, the entire disclosures of which are hereby incorporated herein by reference.

BACKGROUND

The present disclosure relates to a solid-state imaging device, a solid-state imaging method, and an electronic apparatus, and more particularly, to a solid-state imaging device, a solid-state imaging method, and an electronic apparatus that are capable of executing efficient defect correction processing in an image sensor capable of capturing an image in a high dynamic range.

From the past, pixel signals related to defective pixels have been corrected in image signals output from an image sensor.

The defective pixels are normally classified into blown-out highlights (white-dot defective pixels) and blocked-up shadows (black-dot defective pixels). The blown-out highlights (white-dot defective pixels) constantly output pixel signals having extremely large values. The blocked-up shadows (black-dot defective pixels) constantly output pixel signals having extremely small values. The correction processing of the pixel signals related to such defective pixels, that is, defect correction processing, is performed by calculating and generating the pixel signals of the defective pixels based on the pixel signals of pixels located around the defective pixels.

Further, for example, in a pixel array of the Bayer array, a technique of selecting pixels, which are to be used for correction of defective pixels, from pixels having the same color as the defective pixels is also proposed (see, for example, Japanese Patent Application Laid-open No. 2010-130238).

Moreover, in recent years, a method of enlarging the dynamic range of an image sensor has been proposed. For example, there has been developed a technique of obtaining an image in a high dynamic range by changing an exposure time in accordance with the position of a pixel in the pixel array of the Bayer array, the image in the high dynamic range being appropriately displayed from the pixels of low luminance to the pixels of high luminance. Such high-dynamic-range-image-capturing method includes an SVE (Spatially Varying Exposure) method and the like.

SUMMARY

In the correction of the defective pixels in related art, however, the defect correction processing for the image sensor of the SVE method has not been taken into consideration.

The present disclosure has been made in view of such circumstances and it is desirable to allow an image sensor capable of capturing an image in a high dynamic range to execute efficient defect correction processing.

According to a first embodiment of the present disclosure, there is provided a solid-state imaging device including a pixel array and a pixel value correcting unit. The pixel array includes a plurality of pixels, the plurality of pixels each having one of a different exposure time and a different exposure sensitivity and being disposed according to a predetermined rule. The pixel value correcting unit is configured to correct, among pixel values obtained from the plurality of pixels in the pixel array, a pixel value of a pixel of the plurality of pixels that applies to a preset condition, by using a pixel value of another pixel of the plurality of pixels.

The pixel array may include the plurality of pixels each having one of the same exposure time and the same exposure sensitivity and being regularly disposed on a row-by-row basis.

The pixel array may include the plurality of pixels including a predetermined number of pixels each having one of the same exposure time and the same exposure sensitivity and being regularly disposed as an L-shaped group of pixels.

The pixel value correcting unit may be configured to set a pixel of interest in the plurality of pixels disposed in the pixel array to be the center of the pixel array, extract a processing unit area including a preset number of rows of pixels, and correct the pixel value of the pixel of interest for each processing unit area.

The processing unit area may include five rows.

The pixel value correcting unit may include a saturation determining unit, a flatness determining unit, a direction detecting unit, a defect determining unit, and a defect correcting unit. The saturation determining unit may be configured to determine whether the processing unit area is saturated or not based on the number of pixels that output a maximum pixel value among the pixels of the processing unit area. The flatness determining unit may be configured to determine whether or not an image formed of the pixels of the processing unit area is a flat image that is free from a texture. The direction detecting unit may be configured to detect a direction of the texture when it is determined that the image formed of the pixels of the processing unit area is not a flat image. The defect determining unit may be configured to determine whether the pixel of interest is a defective pixel or not. The defect correcting unit may be configured to correct the pixel value of the pixel of interest when it is determined that the pixel of interest is a defective pixel.

In accordance with a result of the determination by the saturation determining unit, the flatness determining unit may be configured to determine whether the image is a flat image or not, and the direction detecting unit may be configured to detect the direction of the texture, by different methods.

In accordance with a result of the determination by the flatness determining unit, the defect determining unit may be configured to determine whether the pixel of interest is a defective pixel or not, and the defect correcting unit may be configured to correct the pixel value of the pixel of interest, by different methods.

The defect correcting unit may be configured to correct the pixel value of the pixel of interest by replacing the pixel value of the pixel of interest with a pixel value of a pixel selected based on the detected direction of the texture, when it is determined that the image formed of the pixels of the processing unit area is not a flat image.

In the case where the pixel array includes the plurality of pixels including a predetermined number of pixels each having one of the same exposure time and the same exposure sensitivity and being regularly disposed as an L-shaped group of pixels, and when the detected direction of the texture is a vertical direction, the defect correcting unit may be configured to generate the pixel value of the pixel selected based on the direction of the texture by linear interpolation.

The defect correcting unit may be configured to mix the pixel value generated by the linear interpolation and the pixel value of the pixel of interest, based on a mixing ratio determined based on the pixel value generated by the linear interpolation.

The solid-state imaging device may further include a gain adding unit configured to multiply, among the pixels of the processing unit area, a pixel value of a pixel having one of a first exposure time and a first exposure sensitivity by a predetermined gain, to thereby normalize the pixel values of the pixels of the processing unit area, with a pixel value of a pixel having one of a second exposure time and a second exposure sensitivity being as a reference.

The solid-state imaging device may include a lamination-type image sensor including a first chip on which the pixel array is disposed, and a second chip including a circuit for achieving a function of the pixel value correcting unit.

According to a second embodiment of the present disclosure, there is provided a solid-state imaging method including correcting, among pixel values obtained from a plurality of pixels in a pixel array, a pixel value of a pixel of the plurality of pixels that applies to a preset condition, by using a pixel value of another pixel of the plurality of pixels, the plurality of pixels each having one of a different exposure time and a different exposure sensitivity and being disposed according to a predetermined rule.

According to a third embodiment of the present disclosure, there is provided an electronic apparatus including a solid-state imaging device including a pixel array and a pixel value correcting unit. The pixel array includes a plurality of pixels, the plurality of pixels each having one of a different exposure time and a different exposure sensitivity and being disposed according to a predetermined rule. The pixel value correcting unit is configured to correct, among pixel values obtained from the plurality of pixels in the pixel array, a pixel value of a pixel of the plurality of pixels that applies to a preset condition, by using a pixel value of another pixel of the plurality of pixels.

In the first to third embodiments of the present disclosure, among pixel values obtained from a plurality of pixels in a pixel array, a pixel value of a pixel of the plurality of pixels that applies to a preset condition is corrected by using a pixel value of another pixel of the plurality of pixels, the plurality of pixels each having one of a different exposure time and a different exposure sensitivity and being disposed according to a predetermined rule.

According to the present disclosure, an image sensor capable of capturing an image in a high dynamic range can execute efficient defect correction processing.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the technology to be disclosed herein will be described with reference to the drawings.

Figure 1:
FIG. 1 is a diagram for describing a row exposure array in an SVE (Spatially Varying Exposure) method.
Figure 2:
FIG. 2 is a diagram for describing a uniform exposure array in the SVE method.

FIGS. 1 and 2 are each a diagram showing an example of a plan view of a pixel array of an image sensor that adopts an SVE (Spatially Varying Exposure) method. The SVE is a technique of obtaining an image in a high dynamic range by changing an exposure time in accordance with the position of a pixel in the pixel array of the Bayer array, the image in the high dynamic range being appropriately displayed from the pixels of low luminance to the pixels of high luminance.

In the examples of FIGS. 1 and 2, pixels with hatching are each assumed as a short-time exposure pixel, and pixels without hatching are each assumed as a long-time exposure pixel.

In the configurations of FIGS. 1 and 2, the exposure arrays differ from each other. Specifically, the array pattern of the short-time exposure pixels and the array pattern of the long-time exposure pixels are different from each other.

In the configuration of FIG. 1, pixels in the two rows from the top are assumed as short-time exposure pixels, pixels in two rows immediately below those two rows are assumed as long-time exposure pixels, pixels in two rows further below are assumed as short-time exposure pixels, and pixels in two rows further below are assumed as long-time exposure pixels. Specifically, pixels having the same exposure time are regularly arrayed on a row-by-row basis in the pixel array. The exposure array shown in FIG. 1 is also referred to as a row exposure array.

In the configuration of FIG. 2, the short-time exposure pixels and long-time exposure pixels of respective colors are arrayed so as to be spatially uniform in the pixel array of the Bayer array. In this example, the short-time exposure pixels and the long-time exposure pixels are regularly arrayed as L-shaped groups of pixels, each group including 4 pixels of R, G, G, and B. The exposure array shown in FIG. 2 is also referred to as uniform exposure array.

Figure 3:
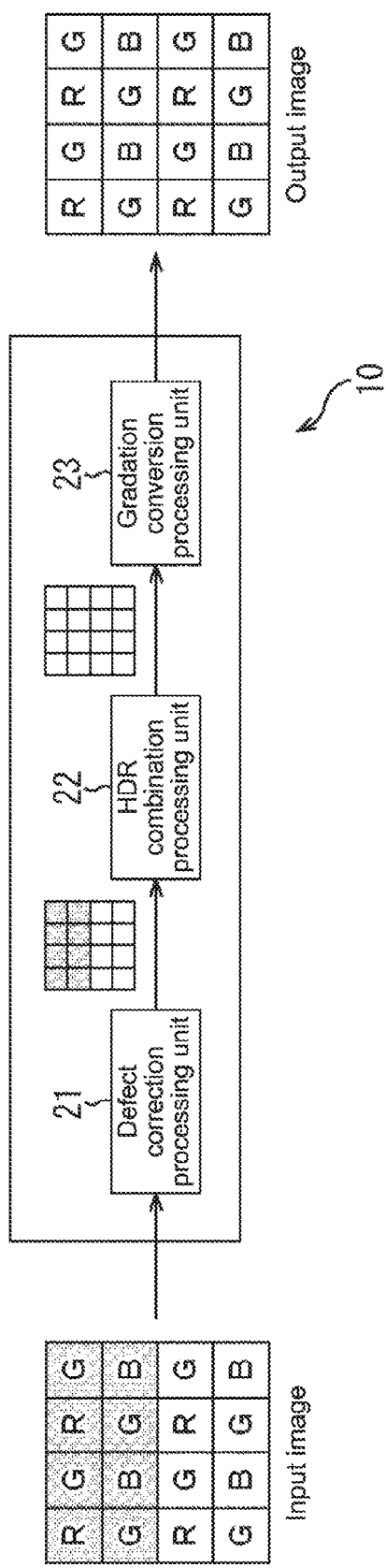
FIG. 3 is a block diagram showing a configuration example of an image processing device according to an embodiment of the present disclosure.

FIG. 3 is a block diagram showing a configuration example of an image processing device 10 according to the embodiment of the present disclosure. The image processing device 10 uses an image, which corresponds to an image signal output from the image sensor of the SVE method, as an input image, to generate and output an output image in a high dynamic range.

Further, as will be described later, the image processing device 10 is mounted to a so-called lower chip in a lamination-type image sensor and is formed integrally with a sensor chip of the image sensor of the SVE method.

In this example, the image processing device 10 includes a defect correction processing unit 21, a high dynamic range (HDR) combination processing unit 22, and a gradation conversion processing unit 23.

The defect correction processing unit 21 is a block for correcting the pixel value of a defective pixel in the input image. The defect correction processing unit 21 corrects the pixel value of each pixel arrayed in the row exposure array or the uniform exposure array as appropriate.

The HDR combination processing unit 22 is a block for generating an image for a dark area and an image for a bright area from one input image, which is formed of pixels arrayed in the row exposure array or the uniform exposure array, and combining those images. Specifically, the HDR combination processing unit 22 generates an image for a dark area, in which the pixel values of the long-time exposure pixels are used to allow the dark area in the image to be clearly displayed, and an image for a bright area, in which the pixel values of the short-time exposure pixels are used to allow the bright area in the image to be clearly displayed. Subsequently, the HDR combination processing unit 22 combines those images for the dark area and for the bright area.

The gradation conversion processing unit 23 is a block for performing gradation conversion processing of adjusting the bit number of the pixel values of the image combined by the HDR combination processing unit 22, for example.

Figure 4:
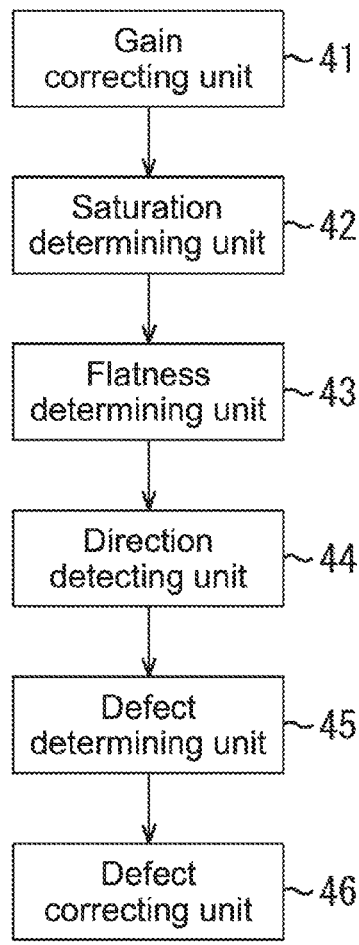
FIG. 4 is a block diagram showing a detailed configuration example of a defect correction processing unit.

Next, the processing by the defect correction processing unit 21 will be described in detail. FIG. 4 is a block diagram showing a detailed configuration example of the defect correction processing unit 21.

The defect correction processing unit 21 assumes each pixel, which is arrayed in an effective area of the pixel array of the image sensor, to be a pixel of interest. In the case where the pixel of interest is a defective pixel, the defect correction processing unit 21 generates a pixel signal of the pixel of interest by using the pixel signal of another pixel. In this example, the defect correction processing unit 21 includes a gain correcting unit 41, a saturation determining unit 42, a flatness determining unit 43, a direction detecting unit 44, a defect determining unit 45, and a defect correcting unit 46.

Although the details are described later, the gain correcting unit 41 is a functional block that multiples by a gain so as to compare the pixel value of the short-time exposure pixel with the pixel value of the long-time exposure pixel mainly in a situation where the long-time exposure pixels and the short-time exposure pixels are mixed in the pixel array of the image sensor of the SVE method.

The saturation determining unit 42 is a functional block that mainly determines whether a predetermined area in the pixel array is saturated or not due to the reception of strong light or the like. In the pixel array of the image sensor of the SVE method, the long-time exposure pixels exist and thus when strong light is received, the pixel values of the long-time exposure pixels reach the maximum values and a state where a correct pixel value corresponding to the amount of received light is not obtained (saturated state) may occur.

The flatness determining unit 43 is a functional block that mainly determines whether a texture or the like is contained in an image corresponding to the light received in the predetermined area in the pixel array (specifically, the image is not flat) or not.

The direction detecting unit 44 is a functional block that detects the direction of the texture in the case where the flatness determining unit 43 determines that a texture or the like is contained in the image corresponding to the light received in the predetermined area in the pixel array.

The defect determining unit 45 is a functional block that mainly determines whether the pixel of interest is a defective pixel or not. It should be noted that the defective pixel is normally classified into a blown-out highlight (white-dot defective pixel) that constantly outputs a pixel signal having an extremely large value or into a blocked-up shadow (black-dot defective pixel) that constantly outputs a pixel signal having an extremely small value.

The defect correcting unit 46 is a functional block that mainly corrects the pixel value of the pixel of interest that is determined to be a defective pixel by the defect determining unit 45, by using the pixel value of another pixel.

It should be noted that the defect correction processing unit 21 executes different processing between the row exposure array and the uniform exposure array, but here, the processing in the row exposure array will be described first.

(Processing of Defect Correction Processing Unit 21 in Row Exposure Array)

The gain correcting unit 41 performs correction for adjusting a difference caused by the difference in exposure time on the pixel values of the input image.

Specifically, the pixel values of the input image correspond to image signals output from the image sensor of the SVE method, and thus the pixel values of the short-time exposure pixels and the pixel values of the long-time exposure pixels are mixed. For example, the gain correcting unit 41 multiples the pixel value of the short-time exposure pixel by a gain that is calculated as (exposure time of long-time exposure pixel/exposure time of short-time exposure pixel). This allows the pixel value of the short-time exposure pixel to be corrected to a pixel value corresponding to the long-time exposure. In other words, the processing by the gain correcting unit 41 normalizes the pixel values of the input image, in which the pixel values of the short-time exposure pixels and the pixel values of the long-time exposure pixels are mixed, based on the pixel values of the long-time exposure pixels.

The saturation determining unit 42 determines whether the pixel values are saturated or not for a processing unit area that is an area having a predetermined number of pixels centering on the pixel of interest. Specifically, the saturation determining unit 42 determines whether the processing unit area corresponds to a significantly bright area in the image or not.

Figure 5:
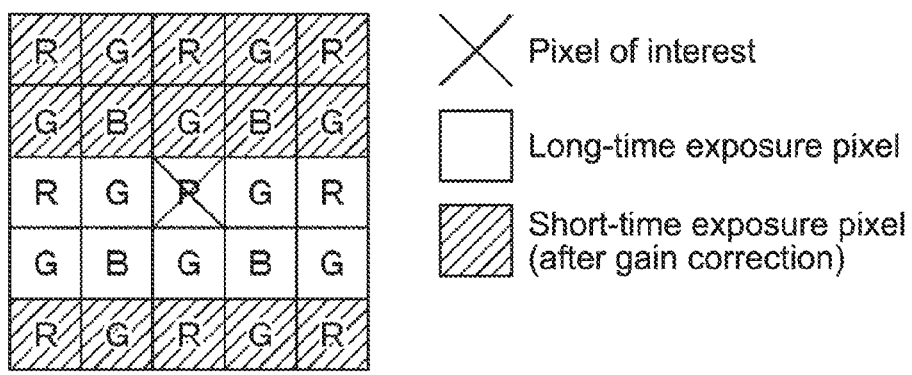
FIG. 5 is a diagram showing an example of a processing unit area in the row exposure array.

FIG. 5 is a diagram showing an example of the processing unit area. In this example, an area formed of 25 (=5×5) pixels in the pixel array of the Bayer array is the processing unit area. In the example of FIG. 5, the pixel of interest is indicated by an x mark and is a red (R) long-time exposure pixel in this example.

The saturation determining unit 42 specifies the number of pixels whose pixel values are the maximum values in the processing unit area formed of 25 pixels centering on the pixel of interest. Here, the pixel whose pixel value is the maximum value means, for example, a pixel having the maximum value that can be expressed in a predetermined bit number in the case where the pixel value is expressed in digital data formed of the predetermined bit number. For example, the maximum value is 255 when expressed in digital data of 8 bits. Specifically, here, when the amount of received light in a unit time is too large to output all the received light as charge by photoelectric conversion, this state is referred to as saturation.

In the case where the number of pixels whose pixel values are the maximum values is equal to or larger than a preset threshold value, the saturation determining unit 42 determines that the processing unit area is saturated. For example, in the case where the number of pixels whose pixel values are the maximum values is 3 (threshold value) or more, the saturation determining unit 42 determines that the processing unit area is saturated. Here, the threshold value is set to 3. This is because, in consideration of the case where the pixel of interest is a white-dot defective pixel, whether the processing unit area is saturated or not can be determined based on whether the two pixels other than the pixel of interest have the maximum values or not.

It should be noted that the processing from the flatness determining unit 43 to the defect correcting unit 46 differs depending on the result of the determination by the saturation determining unit 42. For example, in the case where the saturation determining unit 42 determines that the processing unit area is saturated, the determination by the flatness determining unit 43 and the detection of a direction by the direction detecting unit 44 are not performed. This is because it is difficult to determine whether the saturated processing unit area is an area originally containing the texture or not.

Here, the example of the processing from the flatness determining unit 43 to the defect correcting unit 46 in the case where the saturation determining unit 42 first determines that the processing unit area is not saturated will be described.

(Case where Processing Unit Area is not Saturated in Row Exposure Array)

The flatness determining unit 43 determines whether the processing unit area is flat or not. For example, in the case where the processing unit area is part of a texture in the image, the flatness determining unit 43 determines that the processing unit area is not flat.

Figure 6:
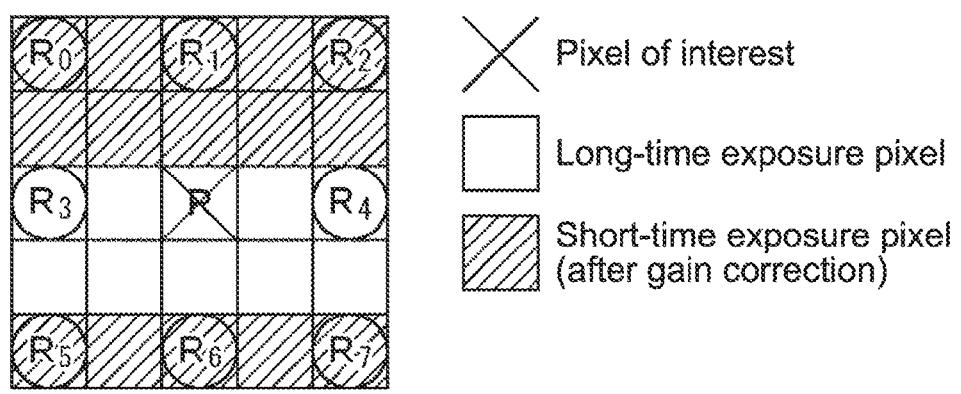
FIG. 6 is a diagram for describing the processing of a flatness determining unit of FIG. 4 in the row exposure array.

The flatness determining unit 43 compares the pixel value of the pixel of interest with the maximum or minimum value in the pixel values of pixels having the same color as the pixel of interest in the processing unit area and determines whether the pixel value of the pixel of interest is larger or smaller than the maximum or minimum value. For example, in the case where the pixel of interest is an R long-time exposure pixel, as shown in FIG. 6, the flatness determining unit 43 specifies the maximum value or the minimum value of 8 R pixels ($R_0$ to $R_7$) indicated by circles in the processing unit area. In the case where the pixel value of the pixel of interest is larger than the maximum value of the pixel values of the $R_0$ to $R_7$, the pixel of interest is assumed as a candidate of the white-dot defective pixel and a predetermined flag or the like is set therefor. Further, in the case where the pixel value of the pixel of interest is smaller than the minimum value of the pixel values of the $R_0$ to $R_7$, the pixel of interest is assumed as a candidate of the black-dot defective pixel and a predetermined flag or the like is set therefor.

Additionally, the flatness determining unit 43 calculates an average deviation of the processing unit area. For example, in the example of FIG. 6, the flatness determining unit 43 calculates an average value "ave_area" of the pixel values of the $R_0$ to $R_7$ by the following expression (1), and using the result of the calculation, calculates an average deviation "std_area" of the processing unit area by the following expression (2).

$$\text{ave\_area} = \frac{1}{8} \sum_{i=0}^{7} R_i \qquad (1)$$

-continued $$\text{std\_area} = \frac{1}{8}\sum_{i=0}^{7} \|\text{ave\_area} - R_i\| \qquad (2)$$

In the case where the average deviation "std_area" calculated by the expression (2) is smaller than a preset threshold value, the flatness determining unit 43 determines that the processing unit area is flat. In the case where the average deviation "std_area" is equal to or larger than the preset threshold value, the flatness determining unit 43 determines that the processing unit area is not flat.

As described above, in the case where the saturation determining unit 42 determines that the processing unit area is saturated, the determination by the flatness determining unit 43 is not performed.

In the case where it is determined that the processing unit area is not flat, the direction detecting unit 44 determines a direction of a texture (pattern) included in the processing unit area.

The direction detecting unit 44 extracts a direction detection area. The direction detection area is formed of 35 (=7×5) pixels and is obtained by expanding the right and left ends of the processing unit area by one pixel. The direction detecting unit 44 calculates 15 absolute values of differences between adjacent pixels having the same color in the direction detection area. At that time, as shown in FIG. 7, the direction detecting unit 44 calculates 15 absolute values of differences between adjacent pixels having the same color in each of 4 directions, that is, a horizontal direction, a vertical direction, a +45° direction, and a −45° direction.

Figure 7:
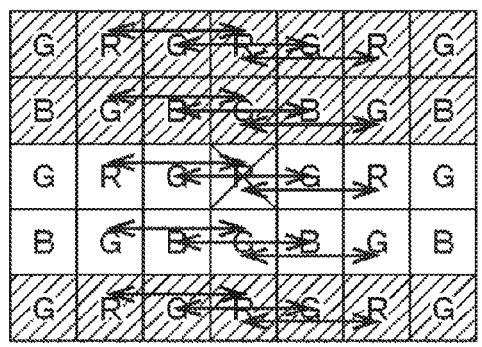
FIG. 7 is a diagram for describing the processing of a direction detecting unit of FIG. 4 in the row exposure array.
Figure 7:
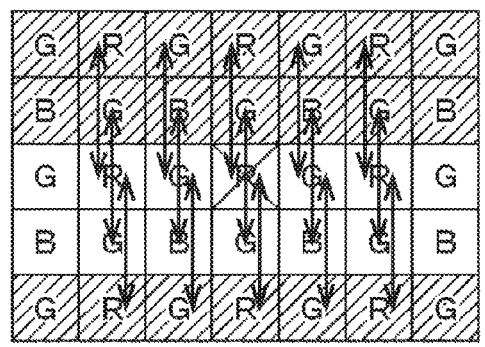
Figure 7:
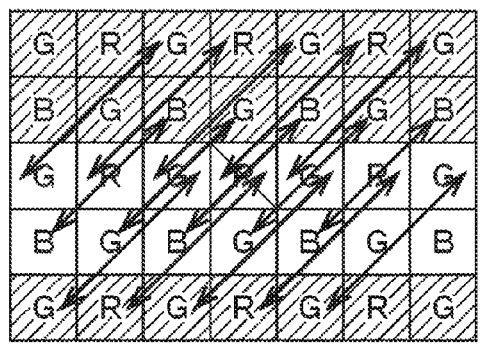
Figure 7:
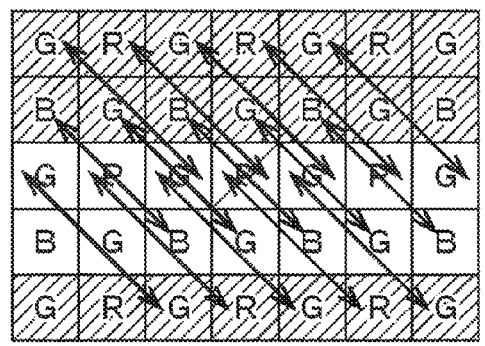
Figure 7:
Figure 7:
Figure 7:

FIG. 7 is a diagram showing, in the upper left part, an example of the calculation of the absolute values of differences between the pixels having the same color and being adjacent in the horizontal direction in the direction detection area. As indicated by horizontal arrows in the upper left part of FIG. 7, the 15 sets of pixels, each set having the same color, are shown.

FIG. 7 is the diagram showing, in the upper right part, an example of the calculation of the absolute values of differences between the pixels having the same color and being adjacent in the vertical direction in the direction detection area. As indicated by vertical arrows in the upper right part of FIG. 7, the 15 sets of pixels, each set having the same color, are shown.

FIG. 7 is the diagram showing, in the lower left part, an example of the calculation of the absolute values of differences between the pixels having the same color and being adjacent in the +45° direction in the direction detection area. As indicated by arrows in the +45° direction in the lower left part of FIG. 7, the 15 sets of pixels, each set having the same color, are shown.

FIG. 7 is the diagram showing, in the lower right part, an example of the calculation of the absolute values of differences between the pixels having the same color and being adjacent in the −45° direction in the direction detection area. As indicated by arrows in the −45° direction in the lower right part of FIG. 7, the 15 sets of pixels, each set having the same color, are shown.

Next, in order to eliminate the influence of the defective pixel in the area, the direction detecting unit 44 selects 11 low-order absolute values of differences from the 15 absolute values of the differences in each of the directions. Specifically, since the absolute values of the differences using the pixel value of a defective pixel do not make sense, 4 high-order absolute values of the differences are eliminated in order to remove the absolute values of the differences using the pixel value of a defective pixel. Here, in consideration of the pixel of interest and another pixel (2 pixels in total) that are defective pixels in the direction detection area, 4 high-order absolute values of the differences are eliminated.

The direction detecting unit 44 calculates an average value of the 11 absolute values of the differences in each of the directions.

Here, the average value of the 11 absolute values of the differences in the horizontal direction and the average value of the 11 absolute values of the differences in the vertical direction are each multiplied by √2. This is because a distance between adjacent pixels in the horizontal direction or the vertical direction is smaller than a distance between adjacent pixels in the +45° direction or the −45° direction and such influence is eliminated.

Additionally, the direction detecting unit 44 selects the minimum value of the 4 average values corresponding to the respective directions and detects a direction corresponding to the minimum value as the direction of the texture.

As described above, in the case where the saturation determining unit 42 determines that the processing unit area is saturated, the detection of the direction by the direction detecting unit 44 is not performed.

The defect determining unit 45 determines whether the pixel of interest is a defective pixel or not.

The defect determining unit 45 first calculates a threshold value for defect determination. It should be noted that the defect determining unit 45 calculates a threshold value based on the result of the determination by the flatness determining unit 43. In the case where the flatness determining unit 43 determines that the processing unit area is flat, the defect determining unit 45 calculates the threshold value by the following expression (3).

$$Th1 = a \times \sqrt{\text{ave\_area}} + b \qquad (3)$$

It should be noted that "a" and "b" in the expression (3) are parameters and are changed in accordance with the magnitude of the average value "ave_area" of the pixel values of the $R_0$ to $R_7$.

On the other hand, in the case where the flatness determining unit 43 determines that the processing unit area is not flat, the defect determining unit 45 calculates the threshold value by the following expression (4).

$$Th2 = a \times \sqrt{\text{ave\_area}} + b \times \text{grad} + c \qquad (4)$$

It should be noted that "a", "b", and "c" in the expression (4) are parameters and are changed in accordance with the magnitude of a minimum value "grad" used for detecting the direction of the texture.

In the case where the processing unit area is flat and the pixel of interest is a candidate of the white-dot defective pixel, the defect determining unit 45 determines whether the absolute value of a difference between the maximum value of the $R_0$ to the $R_7$ of FIG. 6 and the pixel of interest is equal to or larger than the threshold value described above. In the case where the absolute value of a difference between the maximum value of the $R_0$ to $R_7$ and the pixel of interest is equal to or larger than the threshold value described above, the defect determining unit 45 determines that the pixel of interest is a white-dot defective pixel. In the case where the absolute value of a difference between the maximum value of the $R_0$ to $R_7$ and the pixel of interest is smaller than the threshold value, the defect determining unit 45 determines that the pixel of interest is not a defective pixel.

Further, in the case where the processing unit area is flat and the pixel of interest is a candidate of the black-dot defective pixel, the defect determining unit 45 determines whether the absolute value of a difference between the minimum value of the $R_0$ to $R_7$ of FIG. 6 and the pixel of interest is equal to or larger than the threshold value described above. In the case where the absolute value of a difference between the minimum value of the $R_0$ to $R_7$ and the pixel of interest is equal to or larger than the threshold value described above, the defect determining unit 45 determines that the pixel of interest is a black-dot defective pixel. In the case where the absolute value of a difference between the minimum value of the $R_0$ to $R_7$ and the pixel of interest is smaller than the threshold value, the defect determining unit 45 determines that the pixel of interest is not a defective pixel.

Additionally, in the case where the processing unit area is not flat, the defect determining unit 45 determines whether a difference between the pixel value of the pixel of interest and the average value of the pixel values of pixels (for example, $R_0$ to $R_7$ in FIG. 6) having the same color in the processing unit area is equal to or larger than the threshold value described above.

In the case where the difference is equal to or larger than the threshold value, the defect determining unit 45 determines that the pixel of interest is a defective pixel. In the case where the difference is smaller than the threshold value, the defect determining unit 45 determines that the pixel of interest is not a defective pixel. Additionally, in the case where it is determined that the pixel of interest is a defective pixel, when the pixel value of the pixel of interest is larger than the average value of the pixel values of the pixels having the same color in the processing unit area, it is determined that the pixel of interest is a white-dot defective pixel, and when the pixel value of the pixel of interest is smaller than the average value of the pixel values of the pixels having the same color in the processing unit area, it is determined that the pixel of interest is a black-dot defective pixel.

In the case where the processing unit area is flat and when the defect determining unit 45 determines that the pixel of interest is a defective pixel, the defect correcting unit 46 performs correction by replacing the pixel value of the pixel of interest with the pixel value of a pixel having the same color and exposure time as the pixel of interest in the processing unit area.

For example, in the case where the pixel of interest is determined to be a white-dot defective pixel in FIG. 6, the defect correcting unit 46 replaces the pixel value of the pixel of interest with a larger one of the pixel values of the $R_3$ and the $R_4$ in FIG. 6.

Further, for example, in the case where the pixel of interest is determined to be a black-dot defective pixel in FIG. 6, the defect correcting unit 46 replaces the pixel value of the pixel of interest with a smaller one of the pixel values of the $R_3$ and $R_4$ in FIG. 6.

Additionally, in the case where the processing unit area is not flat and when the defect determining unit 45 determines that the pixel of interest is a defective pixel, the defect correcting unit 46 replaces the pixel value based on the direction of the texture that is detected by the direction detecting unit 44.

Specifically, in the case where the direction of the texture is the horizontal direction, when it is determined that the pixel of interest is a white-dot defective pixel, the pixel value of the pixel of interest is replaced with a larger one of the pixel values of the $R_3$ and $R_4$ of FIG. 6, and when it is determined that the pixel of interest is a black-dot defective pixel, the pixel value of the pixel of interest is replaced with a smaller one of the pixel values of the $R_3$ and $R_4$ of FIG. 6. Further, in the case where the direction of the texture is the vertical direction, when it is determined that the pixel of interest is a white-dot defective pixel, the pixel value of the pixel of interest is replaced with a larger one of the pixel values of the $R_1$ and $R_6$ of FIG. 6, and when it is determined that the pixel of interest is a black-dot defective pixel, the pixel value of the pixel of interest is replaced with a smaller one of the pixel values of the $R_1$ and $R_6$ of FIG. 6. Additionally, in the case where the direction of the texture is the +45° direction, when it is determined that the pixel of interest is a white-dot defective pixel, the pixel value of the pixel of interest is replaced with a larger one of the pixel values of the $R_2$ and $R_5$ of FIG. 6, and when it is determined that the pixel of interest is a black-dot defective pixel, the pixel value of the pixel of interest is replaced with a smaller one of the pixel values of the $R_2$ and $R_5$ of FIG. 6. Additionally, in the case where the direction of the texture is the −45° direction, when it is determined that the pixel of interest is a white-dot defective pixel, the pixel value of the pixel of interest is replaced with a larger one of the pixel values of the $R_0$ and $R_7$ of FIG. 6, and when it is determined that the pixel of interest is a black-dot defective pixel, the pixel value of the pixel of interest is replaced with a smaller one of the pixel values of the $R_0$ and $R_7$ of FIG. 6.

It should be noted that the pixels of the $R_0$ to $R_2$ and the pixels of the $R_5$ to $R_7$ in FIG. 6 have exposure time that is different from the exposure time of the pixel of interest, but as described above, the pixel values in the processing unit area are normalized based on the pixel values of the long-time exposure pixels by the processing of the gain correcting unit 41. Thus, the pixels of the $R_0$ to $R_2$ and the pixels of the $R_5$ to $R_7$ can be used for the replacement.

In the case where the pixel of interest is a short-time exposure pixel, however, the defect correcting unit 46 multiplies the pixel value, which is replaced based on the direction of the texture, by a gain that is calculated as (exposure time of short-time exposure pixel/exposure time of long-time exposure pixel), and thus eliminates the influence of the correction by the gain correcting unit 41.

In the case where the saturation determining unit 42 determines that the processing unit area is not saturated, whether the pixel of interest is a defective pixel or not is determined in the manner described above, and the pixel value in the case where the pixel of interest is a defective pixel is corrected.

(Case where Processing Unit Area is Saturated in Row Exposure Array)

Figure 8:
FIG. 8 is a diagram for describing the processing of a defect correcting unit of FIG. 4 when the processing unit area is saturated.
Figure 8:
Figure 8:

Meanwhile, in the case where the saturation determining unit 42 determines that the processing unit area is saturated, the defect determining unit 45 calculates a dynamic range of 9 pixels that are arranged in the horizontal direction while centering on the pixel of interest. For example, an area formed of 9 (1×9) pixels shown in FIG. 8 is extracted as a dynamic range detection area. It should be noted that when the saturation determining unit 42 determines that the processing unit area is saturated, a calculation using a pixel value before the correction by the gain correcting unit 41 is performed.

For pixels having the same color as the pixel of interest and being indicated by circles in FIG. 8 (in this example, R pixels), the defect determining unit 45 calculates 4 absolute values of differences between the pixel values of those pixels that are adjacent as indicated by arrows in FIG. 8, and calculates a dynamic range in the 4 absolute values of the differences. Further, the defect determining unit 45 calculates a dynamic range of the pixel values of pixels having a color that is different from the color of the pixel of interest (in this example, G pixels).

In this example, the case where the pixel of interest is the R pixel has been described, but in the case where the pixel of interest is a G pixel, the R pixel is selected as a pixel having a color that is different from the color of the pixel of interest. Further, in the case where the pixel of interest is a B pixel, the G pixel is selected as a pixel having a color that is different from the color of the pixel of interest.

Subsequently, the defect determining unit 45 calculates a square root of the average value of the pixel values of pixels having the same color as the pixel of interest and being indicated by circles in FIG. 8, and multiplies by a parameter or adding a parameter as appropriate, to set the resultant value as a threshold value for the defect determination. Since first to third conditions are used for the threshold value as described later, three threshold values are calculated with changed parameters.

In the case where all of the following three conditions are satisfied, the defect determining unit 45 determines that the pixel of interest is a white-dot defective pixel.

The first condition is as follows: the pixel value of the pixel of interest is larger than the second-largest pixel value in the pixel values of the 4 pixels having the same color and being indicated by the circles in FIG. 8, and a difference between the pixel value of the pixel of interest and the second-largest pixel value in the pixel values of the 4 pixels indicated by the circles in FIG. 8 is larger than the threshold value.

In consideration of the case where defective pixels having the same color alternately exist, like the order of a defective pixel, a non-defective pixel, a defective pixel, . . . , for example, a difference between the pixel value of the pixel of interest and the largest pixel value is not compared with the threshold value, and the difference between the pixel value of the pixel of interest and the second-largest pixel value is compared with the threshold value.

The second condition is as follows: the dynamic range in the absolute values of differences between the pixel values of the adjacent pixels having the same color as the pixel of interest and being indicated by the circles in FIG. 8 is larger than the threshold value.

The third condition is as follows: the dynamic range of the pixel values of pixels having a color that is different from the color of the pixel of interest shown in FIG. 8 (in FIG. 8, G pixels) is smaller than the threshold value.

In the case where all of the first to third conditions described above are satisfied, it is determined that the pixel of interest is a white-dot defective pixel.

Further, in the case where all of the following three conditions are satisfied, the defect determining unit 45 determines that the pixel of interest is a black-dot defective pixel.

The first condition is as follows: the pixel value of the pixel of interest is smaller than the second-smallest pixel value in the pixel values of the 4 pixels having the same color and being indicated by the circles in FIG. 8, and a difference between the pixel value of the pixel of interest and the second-smallest pixel value in the pixel values of the 4 pixels indicated by the circles in FIG. 8 is larger than the threshold value.

The second and third conditions are the same as those of the white-dot defective pixel, and thus its detailed description will be omitted.

In the case where all of the first to third conditions described above are satisfied, it is determined that the pixel of interest is a black-dot defective pixel.

In the case where the pixel of interest is a white-dot defective pixel, the defect correcting unit 46 replaces the pixel value of the pixel of interest with the second-largest pixel value in the pixel values of the 4 pixels indicated by the circles in FIG. 8. Further, in the case where the pixel of interest is a black-dot defective pixel, the defect correcting unit 46 replaces the pixel value of the pixel of interest with the second-smallest pixel value in the pixel values of the 4 pixels indicated by the circles in FIG. 8.

In the case where the saturation determining unit 42 determines that the processing unit area is saturated, whether the pixel of interest is a defective pixel or not is determined in the manner described above, and the pixel value in the case where the pixel of interest is a defective pixel is corrected.

In such a manner, the defect correction processing unit 21 corrects the pixel value of the defective pixel.

Next, description will be given on the processing of the defect correction processing unit 21 in the case of the uniform exposure array. The case of the uniform exposure array is different from the case of the row exposure array in that the determination by the flatness determining unit 43 and the detection of a direction by the direction detecting unit 44 are performed also when the processing unit area is saturated.

(Processing of Defect Correction Processing Unit 21 in Uniform Exposure Array)

As in the row exposure array, the gain correcting unit 41 performs correction for adjusting a difference caused by the difference in exposure time on the pixel values of the input image.

As in the row exposure array, the saturation determining unit 42 determines whether the pixel values are saturated or not for a processing unit area that is an area having a predetermined number of pixels centering on the pixel of interest. Specifically, the saturation determining unit 42 determines whether the processing unit area corresponds to a significantly bright area in the image or not.

Figure 9:
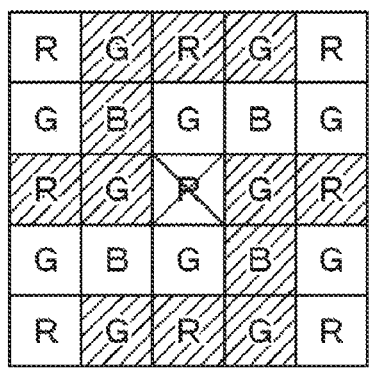
FIG. 9 is a diagram showing an example of the processing unit area in the uniform exposure array.
Figure 9:
Figure 9:
Figure 9:

FIG. 9 is a diagram showing an example of the processing unit area in the uniform exposure array. In this example, an area formed of 25 (=5×5) pixels in the pixel array of the Bayer array is the processing unit area. In the example of FIG. 9, the pixel of interest is indicated by an x mark and is a red (R) long-time exposure pixel in this example.

In the case where the number of pixels whose pixel values are the maximum values is equal to or larger than a preset threshold value, the saturation determining unit 42 determines that the processing unit area is saturated.

For example, in the case where the number of pixels whose pixel values are the maximum values is 3 (threshold value) or more, the saturation determining unit 42 determines that the processing unit area is saturated.

It should be noted that also in the uniform exposure array, the processing from the flatness determining unit 43 to the defect correcting unit 46 differs depending on the result of the determination by the saturation determining unit 42.

Here, the example of the processing from the flatness determining unit 43 to the defect correcting unit 46 in the case where the saturation determining unit 42 first determines that the processing unit area is not saturated will be described.

(Case where Processing Unit Area is not Saturated in Uniform Exposure Array)

The flatness determining unit 43 determines whether the processing unit area is flat or not. For example, in the case where the processing unit area is part of a texture in the image, the flatness determining unit 43 determines that the processing unit area is not flat.

Figure 10:
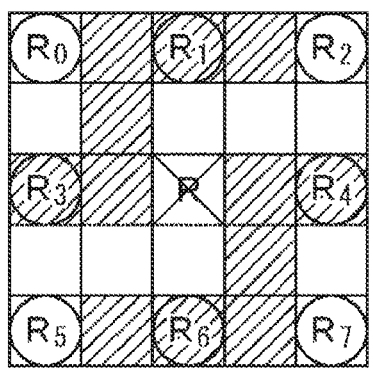
FIG. 10 is a diagram for describing the processing of the flatness determining unit of FIG. 4 in the uniform exposure array.
Figure 10:
Figure 10:
Figure 10:

As in the row exposure array, the flatness determining unit 43 compares the pixel value of the pixel of interest with the maximum or minimum value in the pixel values of pixels having the same color as the pixel of interest in the processing unit area and determines whether the pixel value of the pixel of interest is larger or smaller than the maximum or minimum value. For example, in the case where the pixel of interest is an R long-time exposure pixel, as shown in FIG. 10, the flatness determining unit 43 specifies the maximum value or the minimum value of 8 R pixels ($R_0$ to $R_7$) indicated by circles in the processing unit area. In the case where the pixel value of the pixel of interest is larger than the maximum value in the pixel values of the $R_0$ to $R_7$, the pixel of interest is assumed as a candidate of the white-dot defective pixel and a predetermined flag or the like is set therefor. Further, in the case where the pixel value of the pixel of interest is smaller than the minimum value in the pixel values of the $R_0$ to $R_7$, the pixel of interest is assumed as a candidate of the black-dot defective pixel and a predetermined flag or the like is set therefor.

Additionally, as in the row exposure array, the flatness determining unit 43 calculates an average deviation of the processing unit area.

In the case where the calculated average deviation "std_area" is smaller than a preset threshold value, the flatness determining unit 43 determines that the processing unit area is flat. In the case where the average deviation "std_area" is equal to or larger than the preset threshold value, the flatness determining unit 43 determines that the processing unit area is not flat.

Figure 11:
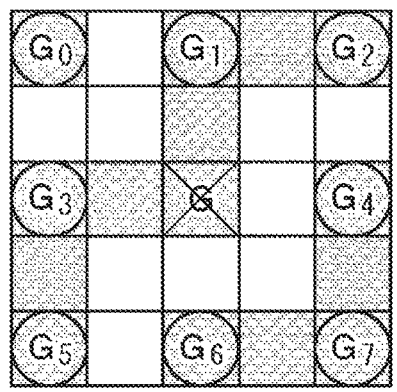
FIG. 11 is a diagram for describing the processing of the flatness determining unit of FIG. 4 when a pixel of interest is a G pixel in the uniform exposure array.

In the uniform exposure array, however, when the pixel of interest is a G pixel, it is assumed that pixels having the same color as the pixel of interest are disposed in the processing unit area as shown in FIG. 11.

Specifically, in the processing unit area, all the pixels having the same color as the pixel of interest have the same exposure time (in this example, short-time exposure pixels).

Consequently, when the pixel of interest is a G pixel, a calculation using a pixel value before correction by the gain correcting unit 41 is performed. For that reason, in the uniform exposure array, three threshold values, that is, a threshold value for an R or B pixel, a threshold value for a G long-time exposure pixel, and a threshold value for a G short-time exposure pixel, are prepared as threshold values used for determining whether the processing unit area is flat or not.

In the case where it is determined that the processing unit area is not flat, as in the row exposure array, the direction detecting unit 44 determines a direction of a texture (pattern) included in the processing unit area.

In each of the case where the processing unit area is flat and the case where the processing unit area is not flat, as in the row exposure array, the defect determining unit 45 determines whether the pixel of interest is a defective pixel or not. When a threshold value for defect determination is calculated, however, the defect determining unit 45 calculates three threshold values, that is, a threshold value for an R or B pixel, a threshold value for a G long-time exposure pixel, and a threshold value for a G short-time exposure pixel.

As in the row exposure array, in the case where the processing unit area is flat and when the defect determining unit 45 determines that the pixel of interest is a defective pixel, the defect correcting unit 46 performs correction by replacing the pixel value of the pixel of interest with the pixel value of a pixel having the same color and exposure time as the pixel of interest in the processing unit area.

In the uniform exposure array, when the pixel of interest is an R pixel, the $R_0$, $R_2$, $R_5$, or $R_7$ in FIG. 10 is used as a pixel to be replaced, and when the pixel of interest is a G pixel, $G_0$ to $G_7$ in FIG. 11 is used as a pixel to be replaced. It should be noted that when the pixel of interest is a B pixel, as in the case where the pixel of interest is an R pixel, a pixel having the same color and exposure time as the pixel of interest in the processing unit area is used.

Additionally, as in the row exposure array, in the case where the processing unit area is not flat and when the defect determining unit 45 determines that the pixel of interest is a defective pixel, the defect correcting unit 46 replaces the pixel value based on the direction of the texture that is detected by the direction detecting unit 44.

In the case where the saturation determining unit 42 determines that the processing unit area is not saturated, whether the pixel of interest is a defective pixel or not is determined in the manner described above, and the pixel value in the case where the pixel of interest is a defective pixel is corrected.

(Case where Processing Unit Area is Saturated in Uniform Exposure Array)

Meanwhile, in the processing of correcting a defective pixel related to the uniform exposure array, the processing by the flatness determining unit 43 and the processing by the direction detecting unit 44 are performed also when the saturation determining unit 42 determines that the processing unit area is saturated.

In the case where the pixel of interest is a G pixel, as in the row exposure array, the flatness determining unit 43 determines whether the processing unit area is flat or not.

Figure 12:
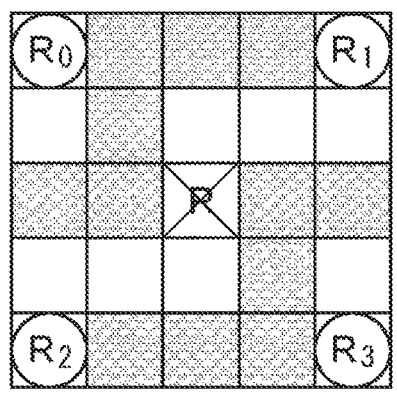
FIG. 12 is a diagram for describing the processing of the defect correcting unit of FIG. 4 when the processing unit area is not saturated in the uniform exposure array.

On the other hand, in the case where the pixel of interest is an R or B pixel, the flatness determining unit 43 determines whether the pixel value of the pixel of interest is larger or smaller than the maximum or minimum value in the pixel values of 4 pixels having the same color and exposure time as the pixel of interest and being indicated by circles in FIG. 12, for example. In the case where the pixel value of the pixel of interest is larger than the maximum value in the pixel values of the 4 pixels, the pixel of interest is assumed as a candidate of the white-dot defective pixel and a predetermined flag or the like is set therefor. Further, in the case where the pixel value of the pixel of interest is smaller than the minimum value in the pixel values of the 4 pixels, the pixel of interest is assumed as a candidate of the black-dot defective pixel and a predetermined flag or the like is set therefor.

It should be noted that FIG. 12 shows as an example the case where the pixel of interest is the R long-time exposure pixel, but the same holds true for the case where the pixel of interest is an R short-time exposure pixel, a B long-time exposure pixel, or a B short-time exposure pixel.

Additionally, the flatness determining unit 43 calculates an average deviation of the processing unit area. For example, in the example of FIG. 10, the flatness determining unit 43 calculates an average value "ave_area" of the pixel values of the $R_0$, $R_2$, $R_5$, and $R_7$ by the following expression (5), and using the result of the calculation, calculates an average deviation "std_area" of the processing unit area by the following expression (6).

$$\text{ave\_area} = \frac{1}{4}\sum_{i=0}^{3} R_i \qquad (5)$$

$$\text{std\_area} = \frac{1}{4}\sum_{i=0}^{3} \|\text{ave\_area} - R_i\| \qquad (6)$$

In the case where the average deviation "std_area" calculated by the expression (6) is smaller than a preset threshold value, the flatness determining unit 43 determines that the processing unit area is flat. In the case where the average deviation "std_area" is equal to or larger than the preset threshold value, the flatness determining unit 43 determines that the processing unit area is not flat.

It should be noted that in the uniform exposure array, when the processing unit area is saturated, 4 threshold values, that is, a threshold value for an R or B long-time exposure pixel, a threshold value for an R or B short-time exposure pixel, a threshold value for a G long-time exposure pixel, and a threshold value for a G short-time exposure pixel, are prepared as threshold values used for determining whether the processing unit area is flat or not.

In the case where it is determined that the processing unit area is not flat, the direction detecting unit 44 determines a direction of a texture (pattern) included in the processing unit area.

In this case, since it is thought that the long-time exposure pixels are saturated, the direction detection using only G short-time exposure pixels is performed.

The direction detecting unit 44 extracts a direction detection area that is formed of 35 (=7×5) pixels and is obtained by expanding the right and left ends of the processing unit area by one pixel. The direction detecting unit 44 calculates absolute values of differences between adjacent G pixels in the direction detection area. At that time, as shown in FIG. 13, the direction detecting unit 44 calculates absolute values of differences between adjacent G pixels in each of 4 directions, that is, a horizontal direction, a vertical direction, a +45° direction, and −45° direction.

Figure 13:
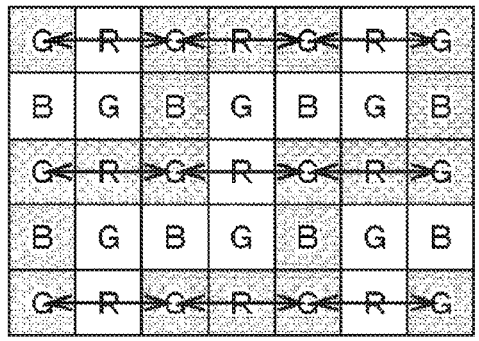
FIG. 13 is a diagram for describing the processing of the direction detecting unit of FIG. 4 when the processing unit area is saturated in the uniform exposure array.
Figure 13:
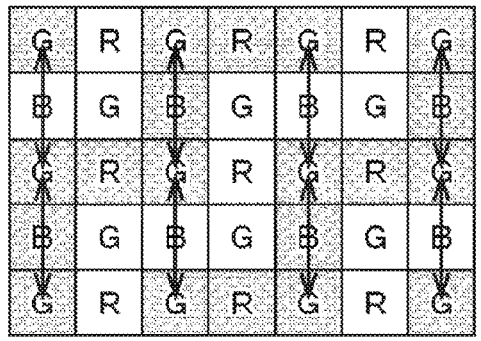
Figure 13:
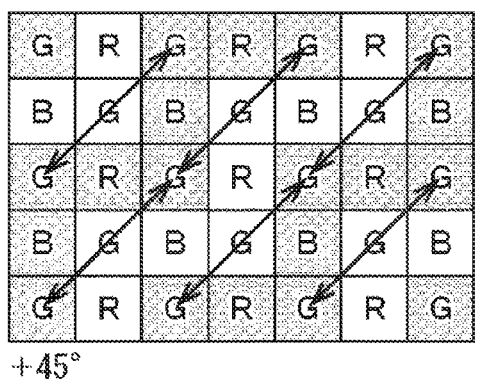
Figure 13:
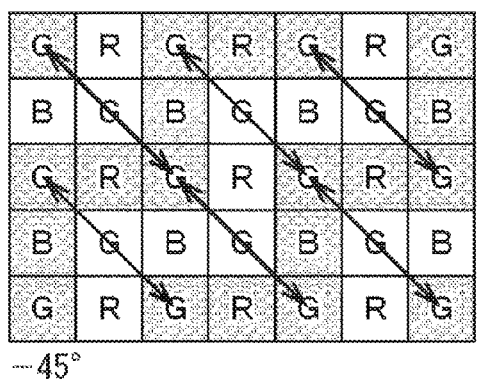
Figure 13:
Figure 13:

FIG. 13 is a diagram showing, in the upper left part, an example of the calculation of the absolute values of differences between G pixels that are adjacent in the horizontal direction in the direction detection area. As indicated by horizontal arrows in the upper left part of FIG. 13, 9 sets of G pixels are shown.

FIG. 13 is the diagram showing, in the upper right part, an example of the calculation of the absolute values of differences between G pixels that are adjacent in the vertical direction in the direction detection area. As indicated by vertical arrows in the upper right part of FIG. 13, 8 sets of G pixels are shown.

FIG. 13 is the diagram showing, in the lower left part, an example of the calculation of the absolute values of differences between G pixels that are adjacent in the +45° direction in the direction detection area. As indicated by arrows in the +45° direction in the lower left part of FIG. 13, six sets of G pixels are shown.

FIG. 13 is the diagram showing, in the lower right part, an example of the calculation of the absolute values of differences between G pixels that are adjacent in the −45° direction in the direction detection area. As indicated by arrows in the −45° direction in the lower right part of FIG. 13, six sets of G pixels are shown.

Next, in order to eliminate the influence of the defective pixel in the area, the direction detecting unit 44 selects 4 low-order absolute values of differences from the absolute values of the differences in each of the directions. Specifically, since the absolute values of the differences using the pixel value of a defective pixel do not make sense, high-order absolute values of the differences are eliminated in order to remove the absolute values of the differences using the pixel value of a defective pixel.

The direction detecting unit 44 calculates an average value of the 4 absolute values of the differences in each of the directions.

Here, the average value of the 4 absolute values of the differences in the horizontal direction and the average value of the 4 absolute values of the differences in the vertical direction are each multiplied by $\sqrt{2}$. This is because a distance between adjacent pixels in the horizontal direction or the vertical direction is smaller than a distance between adjacent pixels in the +45° direction or the −45° direction and such influence is eliminated.

Additionally, the direction detecting unit 44 selects the minimum value of the 4 average values corresponding to the respective directions and detects a direction corresponding to the minimum value as the direction of the texture.

In the example of FIG. 13, in the case where the pixel of interest is a G short-time exposure pixel or a B pixel, when an area formed of 35 (=7×5) pixels in which the number of G short-time exposure pixels becomes the largest is extracted, the position of the pixel of interest does not come to the center of the area. In such a case, the result of the direction detection with a pixel located on the left of the pixel of interest being at the center is used.

In the case where the processing unit area is flat, as in the row exposure array, the defect determining unit 45 determines whether the pixel of interest is a defective pixel or not. In the uniform exposure array, however, when a threshold value for defect determination is calculated, the defect determining unit 45 calculates three threshold values, that is, a threshold value for an R or B pixel, a threshold value for a G long-time exposure pixel, and a threshold value for a G short-time exposure pixel.

Further, in the case where the processing unit area is not flat, the defect determining unit 45 determines whether the pixel of interest is a defective pixel or not as follows.

Specifically, when a threshold value for defect determination is calculated, the defect determining unit 45 calculates a threshold value by using the average value of pixels having the same color and exposure time as the pixel of interest in the processing unit area and using the average value corresponding to the direction detected by the direction detecting unit 44 (the average value of the 4 absolute values of the differences). For example, in the case where the pixel of interest is an R or B pixel, the defect determining unit 45 calculates a threshold value by using a square root of the average value of the pixel values of the 4 pixels, which are located at positions expressed in white and indicated by the circles in FIG. 10, and using the average value corresponding to the direction detected by the direction detecting unit 44. On the other hand, in the case where the pixel of interest is a G pixel, the defect determining unit 45 calculates a threshold value by using a square root of the average value of the pixel values of the 8 pixels, which are located at positions indicated by the circles in FIG. 11, and using the average value corresponding to the direction detected by the direction detecting unit 44.

However, when the threshold value for the defect determination is calculated, the defect determining unit 45 calculates three threshold values, that is, a threshold value for an R or B pixel, a threshold value for a G long-time exposure pixel, and a threshold value for a G short-time exposure pixel.

In the case where the pixel of interest is the R or B pixel and when a difference between the pixel value of the pixel of interest and the average value of the pixel values of the 4 pixels, which are located at positions expressed in white and indicated by the circles in FIG. 10, is equal to or larger than the threshold value, the defect determining unit 45 determines that the pixel of interest is a defective pixel. Further, in the case where the pixel of interest is a G pixel and when a difference between the pixel value of the pixel of interest and the average value of the pixel values of the 8 pixels, which are located at positions indicated by the circles in FIG. 11, is equal to or larger than the threshold value, the defect determining unit 45 determines that the pixel of interest is a defective pixel.

As in the row exposure array, in the case where the processing unit area is flat and when the defect determining unit 45 determines that the pixel of interest is a defective pixel, the defect correcting unit 46 performs correction by replacing the pixel value of the pixel of interest with the pixel value of a pixel having the same color and exposure time as the pixel of interest in the processing unit area.

On the other hand, in the case where the processing unit area is not flat, the defect correcting unit 46 performs different processing depending on whether the pixel of interest is the G pixel or the pixel of interest is the R or B pixel.

In the case where the pixel of interest is the G pixel, the defect correcting unit 46 selects two pixels from the 8 pixels located at positions indicated by the circles in FIG. 11, based on the direction of the texture that is detected by the direction detecting unit 44.

Specifically, in the case where the direction of the texture is the horizontal direction, the $G_3$ and the $G_4$ in FIG. 11 are selected. Further, in the case where the direction of the texture is the vertical direction, the $G_1$ and the $G_6$ in FIG. 11 are selected. Furthermore, in the case where the direction of the texture is the +45° direction, the $G_2$ and the $G_5$ in FIG. 11 are selected. Additionally, in the case where the direction of the texture is the −45° direction, the $G_0$ and the $G_7$ in FIG. 11 are selected.

In the case where it is determined that the pixel of interest is a white-dot defective pixel, the defect correcting unit 46 replaces the pixel value of the pixel of interest with a larger one of the pixel values of the two pixels selected as described above. Further, in the case where it is determined that the pixel of interest is a black-dot defective pixel, the defect correcting unit 46 replaces the pixel value of the pixel of interest with a smaller one of the pixel values of the two pixels selected as described above.

Figure 14:
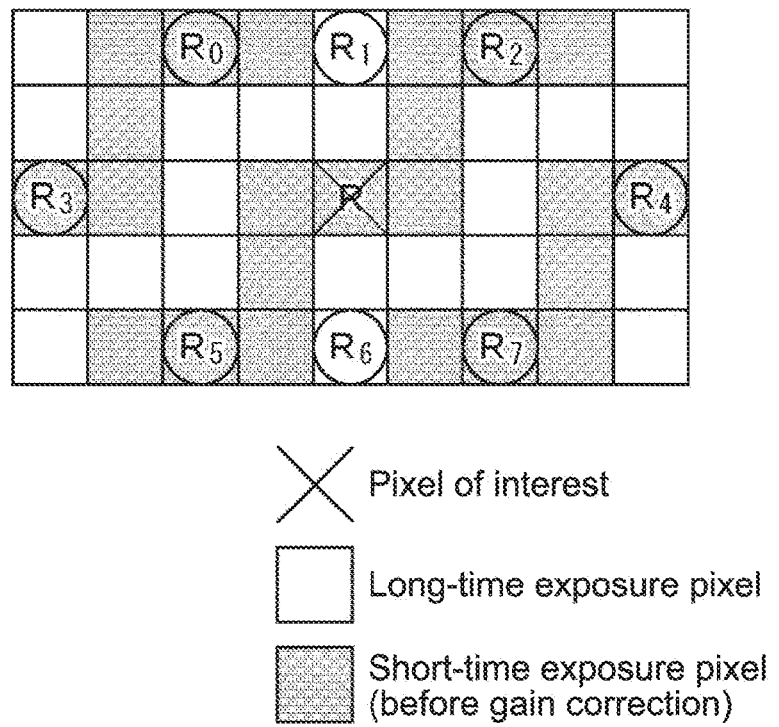
FIG. 14 is a diagram for describing the processing of the defect correcting unit of FIG. 4 when the processing unit area is saturated in the uniform exposure array.

In the case where the pixel of interest is the R or B pixel, the defect correcting unit 46 selects two pixels from the 8 pixels located at positions indicated by circles in FIG. 14 for example, based on the direction of the texture that is detected by the direction detecting unit 44.

Specifically, in the case where the direction of the texture is the +45° direction, the $R_2$ and the $R_5$ of FIG. 14 are selected. In the case where the direction of the texture is the −45° direction, the $R_0$ and the $R_7$ of FIG. 14 are selected.

In the case where the direction of the texture is the horizontal direction, the $R_3$ and the $R_4$ of FIG. 14 are selected. In the uniform exposure array, a pixel that is closest to the pixel of interest in the horizontal direction and has the same color as the pixel of interest is a pixel having exposure time that is different from the exposure time of the pixel of interest. So, it is necessary to select pixels from a direction detection area formed of 45 (=9×5) pixels, which is obtained by further expanding the direction detection area formed of 35 (=7×5) pixels.

In the case where the direction of the texture is the vertical direction, the pixel values of pixels at two positions in the vertical direction are calculated by linear interpolation. Specifically, a virtual pixel having a pixel value calculated as $(R_0+R_2)/2$ and a virtual pixel having a pixel value calculated as $(R_5+R_7)/2$ are selected. This is because, in the uniform exposure array, pixels having the same color and exposure time as the pixel of interest do not exist in the vertical direction in the area corresponding to five rows.

In the case where it is determined that the pixel of interest is a white-dot defective pixel, the defect correcting unit 46 replaces the pixel value of the pixel of interest with a larger one of the pixel values of the two pixels selected as described above. Further, in the case where it is determined that the pixel of interest is a black-dot defective pixel, the defect correcting unit 46 replaces the pixel value of the pixel of interest with a smaller one of the pixel values of the two pixels selected as described above.

However, in the case where the pixel of interest is the R or B pixel and the direction of the texture is the vertical direction, since the replacement with the pixel value of the virtual pixel is performed as described above, the defect correcting unit 46 not totally but partially replaces the pixel value of the pixel of interest with the pixel value of the virtual pixel.

In the case where the pixel of interest is the R or B pixel and the direction of the texture is the vertical direction, the defect correcting unit 46 calculates, together with the pixel values of the two virtual pixels described above, an average value (in the case of FIG. 14, $(R_1+R_6)/2$) of the pixels having the same color in the vertical direction (in this case, the virtual pixels obtained by linear interpolation). It should be noted that the pixels having the same color and being in the vertical direction have exposure time that is different from the exposure time of the pixel of interest. So, the pixel values of the short-time exposure pixels are previously corrected by being multiplied by a gain obtained by (exposure time of long-time exposure pixel/exposure time of short-time exposure pixel).

Next, a difference between a pixel value to be replaced, which is one of the pixel values of the virtual pixels and is referred to as correction candidate value, and the average value of the pixel values of the pixels having the same color in the vertical direction is calculated. Subsequently, in accordance with the magnitude of the difference, the pixel value of the pixel of interest is mixed to the correction candidate value.

Figure 15:
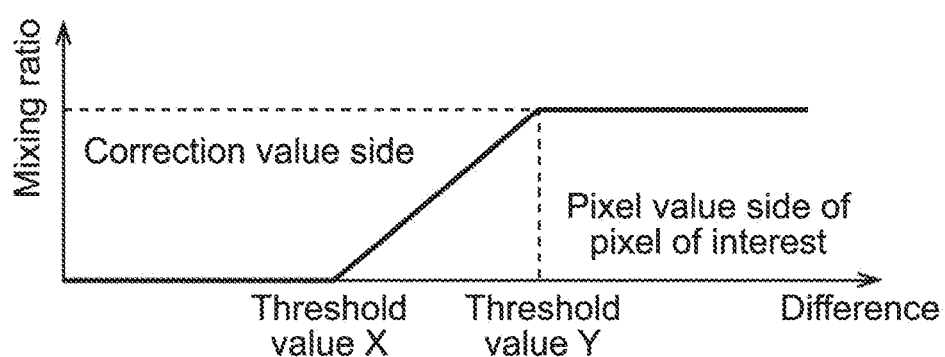
FIG. 15 is a diagram for describing a method of mixing a correction candidate value and the pixel value of the pixel of interest.

FIG. 15 is a diagram for describing a method of mixing the correction candidate value and the pixel value of the pixel of interest. In FIG. 15, the horizontal axis indicates the difference between the correction candidate value and the average value of the pixel values of the pixels having the same color in the vertical direction, and the vertical axis indicates a mixing ratio of the pixel value of the pixel of interest.

As shown in FIG. 15, a threshold value X and a threshold value Y are previously set, and in the case where the difference between the correction candidate value and the average value of the pixel values of the pixels having the same color in the vertical direction is smaller than the threshold value X, the mixing ratio of the pixel value of the pixel of interest is set to 0. Further, in the case where the difference between the correction candidate value and the average value of the pixel values of the pixels having the same color in the vertical direction is equal to or larger than the threshold value Y, the mixing ratio of the pixel value of the pixel of interest is set to 1. Furthermore, in the case where the difference between the correction candidate value and the average value of the pixel values of the pixels having the same color in the vertical direction is equal to or larger than the threshold value X and smaller than the threshold value Y, the mixing ratio of the pixel value of the pixel of interest is changed in accordance with the magnitude of the difference between the correction candidate value and the average value of the pixel values of the pixels having the same color in the vertical direction.

In the case where the difference between the correction candidate value and the average value of the pixel values of the pixels having the same color in the vertical direction is large, it is thought that the image in the processing unit area includes the R or B pixels having a component near a Nyquist frequency. In such a case, when a correction is performed using the pixel value of the virtual pixel that is obtained by linear interpolation by use of adjacent pixels, a color that does not originally exist may be added or artifacts may occur.

As described above, in the case where the pixel of interest is the R or B pixel and the direction of the texture is the vertical direction, the pixel value of the pixel of interest is partially replaced with the pixel value of the virtual pixel. This can allow the occurrence of the addition of color or artifacts to be suppressed.

Additionally, in the present disclosure, in the case where the pixel of interest is the R or B pixel and the direction of the texture is the vertical direction as described above, the pixel value of the pixel of interest is partially replaced with the pixel value of the virtual pixel. This can allow the capacity of a memory necessary in the defect correction processing to be suppressed at low level.

Specifically, in any of the row exposure array and the uniform exposure array, in order to select a pixel having the same color and exposure time as the pixel of interest and being in the vertical direction, it is necessary to store a pixel area corresponding to at least nine rows in a memory or the like.

Figure 16A:
FIGS. 16A and 16B are each a diagram for describing a pixel area that is necessary to select pixels having the same color and exposure time as the pixel of interest and being in a vertical direction.
Figure 16A:
Figure 16A:
Figure 16B:
Figure 16B:
Figure 16B:

FIGS. 16A and 16B are each a diagram for describing a pixel area that is necessary to select pixels having the same color and exposure time as the pixel of interest and being in the vertical direction. FIG. 16A indicates an example of the row exposure array, and FIG. 16B indicates an example of the uniform exposure array. In any of FIGS. 16A and 16B, in order to select pixels having the same color and exposure time as the pixel of interest and being in the vertical direction, it is necessary to prepare a pixel area corresponding to nine rows.

In contrast to this, in the present disclosure, as described above with reference to FIG. 14, the pixel area corresponding to five rows allows the correction of a defective pixel to be performed.

Next, the example of the defect correction processing in the row exposure array by the defect correction processing unit 21 will be described with reference to the flowchart of FIG. 17.

In Step S21, the gain correcting unit 41 performs correction for adjusting a difference caused by the difference in exposure time on the pixel values of the input image. For example, the gain correcting unit 41 multiplies the pixel value of the short-time exposure pixel by a gain that is calculated as (exposure time of long-time exposure pixel/exposure time of short-time exposure pixel). This allows the pixel value of the short-time exposure pixel to be corrected to a pixel value corresponding to the long-time exposure.

It should be noted that in the processing subsequent to Step S21, not only a pixel value after the correction by the gain correcting unit 41 but also a pixel value before the correction can be referred to as appropriate.

In Step S22, the saturation determining unit 42 determines whether the pixel values are saturated or not for a processing unit area that is an area having a predetermined number of pixels centering on the pixel of interest. Specifically, the saturation determining unit 42 determines whether the processing unit area corresponds to a significantly bright area in the image or not.

At that time, for example, in the case where the number of pixels whose pixel values are the maximum values is equal to or larger than a preset threshold value, it is determined that the processing unit area is saturated. For example, in the case where the number of pixels whose pixel values are the maximum values is 3 (threshold value) or more, it is determined that the processing unit area is saturated.

In Step S22, in the case where the saturation determining unit 42 determines that the processing unit area is not saturated, the processing proceeds to Step S23.

Figure 18:
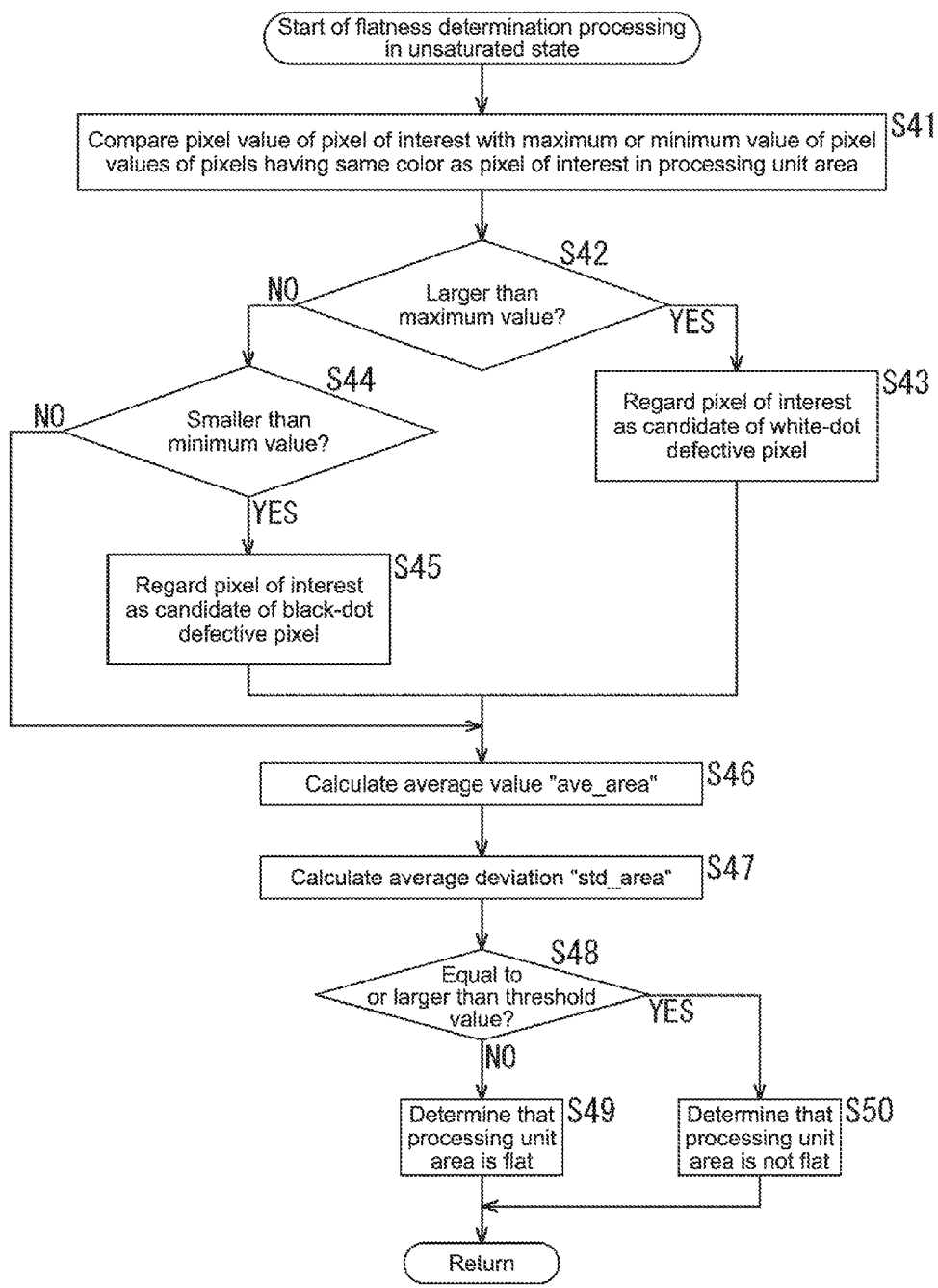
FIG. 18 is a flowchart for describing an example of flatness determination processing in an unsaturated state.

In Step S23, the flatness determining unit 43 executes flatness determination processing in an unsaturated state that will be described later with reference to FIG. 18. Through this processing, it is determined whether the processing unit area is flat or not.

Here, a detailed example of the flatness determination processing in the unsaturated state in Step S23 of FIG. 17 will be described with reference to the flowchart of FIG. 18.

In Step S41, the flatness determining unit 43 compares the pixel value of the pixel of interest with the maximum or minimum value in the pixel values of pixels having the same color as the pixel of interest in the processing unit area.

In Step S42, as a result of the comparison in Step S41, the flatness determining unit 43 determines whether the pixel value of the pixel of interest is larger than the maximum value or not. In Step S42, in the case where the flatness determining unit 43 determines that the pixel value of the pixel of interest is larger than the maximum value, the processing proceeds to Step S43.

In Step S43, the pixel of interest is regarded as a candidate of the white-dot defective pixel and a predetermined flag or the like is set therefor.

On the other hand, in Step S42, in the case where the flatness determining unit 43 determines that the pixel value of the pixel of interest is not larger than the maximum value, the processing proceeds to Step S44.

In Step S44, as a result of the comparison in Step S41, the flatness determining unit 43 determines whether the pixel value of the pixel of interest is smaller than the minimum value or not. In Step S44, in the case where the flatness determining unit 43 determines that the pixel value of the pixel of interest is smaller than the minimum value, the processing proceeds to Step S45.

In Step S45, the pixel of interest is regarded as a candidate of the black-dot defective pixel and a predetermined flag or the like is set therefor.

In Step S44, in the case where the flatness determining unit 43 determines that the pixel value of the pixel of interest is not smaller than the minimum value, the processing of Step S45 is skipped.

In Step S46, the flatness determining unit 43 calculates an average value "ave_area" of the pixel values of the pixels having the same color as the pixel of interest. At that time, the average value "ave_area" is calculated by the expression (1), for example.

In Step S47, the flatness determining unit 43 calculates an average deviation "std_area" of the processing unit area by using the result of the calculation in Step S46. At that time, the average deviation "std_area" is calculated by the expression (2), for example.

In Step S48, the flatness determining unit 43 determines whether the average deviation "std_area" calculated in the processing of Step S47 is equal to or larger than a preset threshold value.

In Step S48, in the case where the flatness determining unit 43 determines that the average deviation "std_area" is smaller than the threshold value, the processing proceeds to Step S49 and the flatness determining unit 43 determines that the processing unit area is flat.

In Step S48, in the case where the flatness determining unit 43 determines that the average deviation "std_area" is equal to or larger than the threshold value, the processing proceeds to Step S50 and the flatness determining unit 43 determines that the processing unit area is not flat.

In such a manner, the flatness determination processing in the unsaturated state is executed.

Referring back to FIG. 17, in Step S24, the flatness determining unit 43 determines whether the result of the determination in Step S23 is "flat" or not. In the case where the result of the determination in Step S23 is "flat", the processing proceeds to Step S25.

Figure 19:
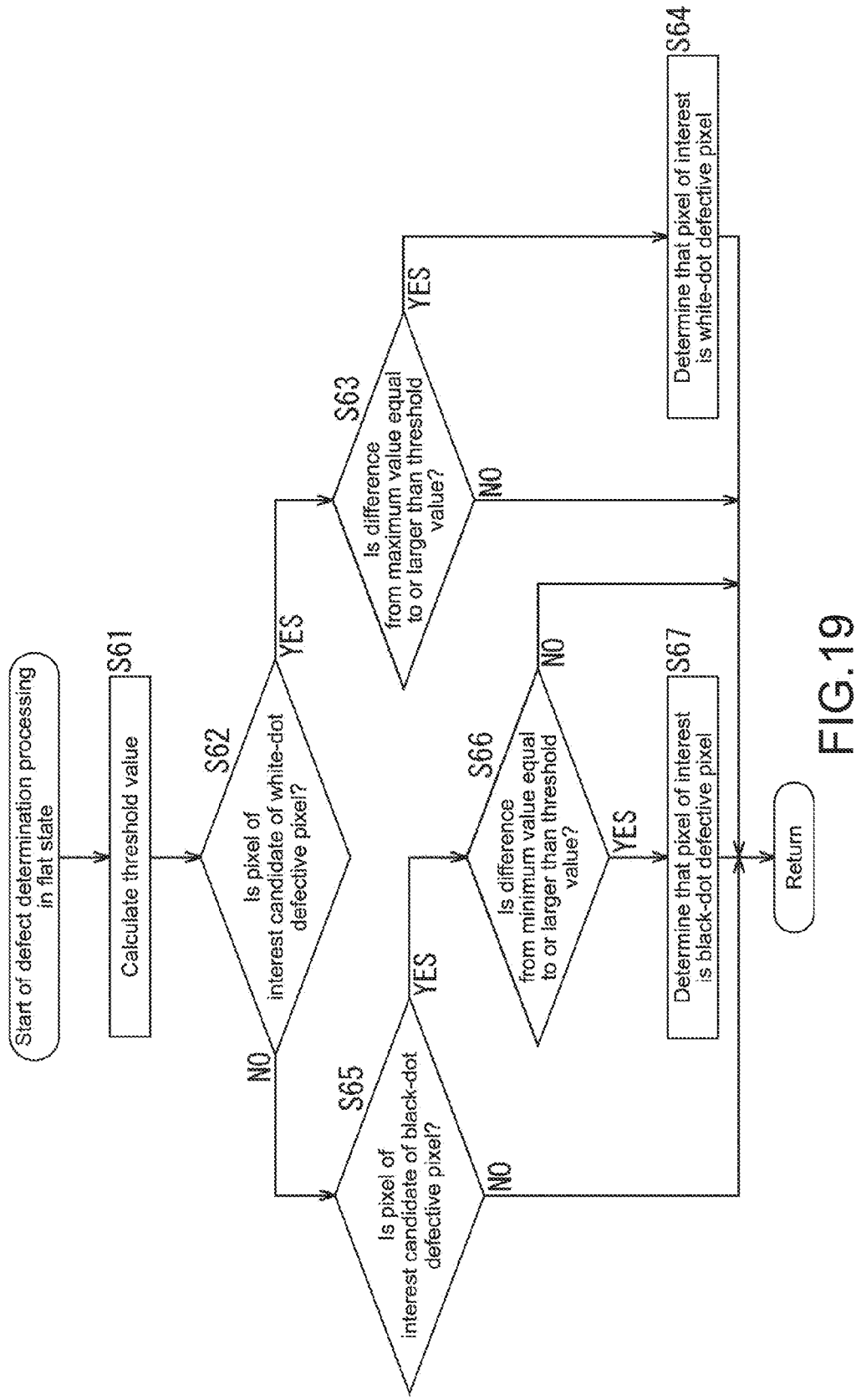
FIG. 19 is a flowchart for describing an example of defect determination processing in a flat state.

In Step S25, the defect determining unit 45 executes defect determination processing in a flat state that will be described later with reference to FIG. 19. Through this processing, it is determined whether the pixel of interest is a defective pixel or not.

Figure 20:
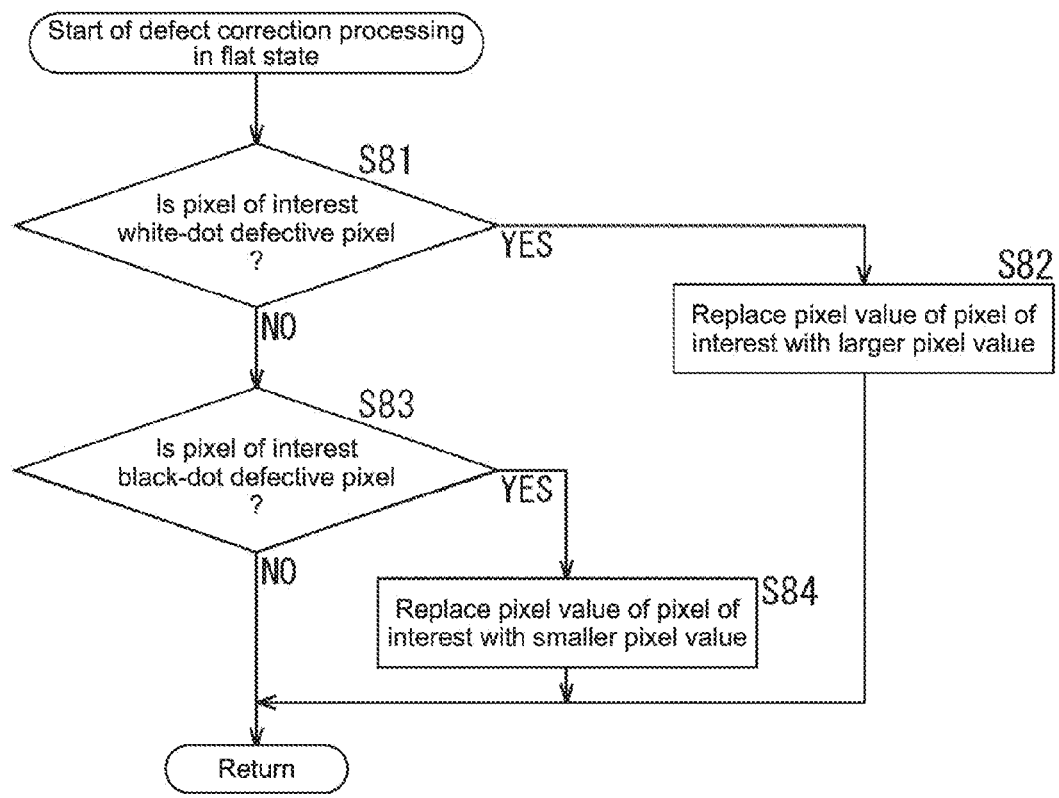
FIG. 20 is a flowchart for describing an example of defect correction processing in a flat state.

In Step S26, the defect correcting unit 46 executes defect correction processing in a flat state that will be described later with reference to FIG. 20. Through this processing, the pixel value of the pixel of interest as a defective pixel is corrected.

Here, a detailed example of the defect determination processing in the flat state in Step S25 of FIG. 17 will be described with reference to the flowchart of FIG. 19.

In Step S61, the defect determining unit 45 calculates a threshold value for defect determination. At that time, the threshold value is calculated by the expression (3), for example.

In Step S62, the defect determining unit 45 determines whether the pixel of interest is a candidate of the white-dot defective pixel or not. In the case where the defect determining unit 45 determines that the pixel of interest is a candidate of the white-dot defective pixel, the processing proceeds to Step S63.

In Step S63, the defect determining unit 45 determines whether a difference between the pixel value of the pixel of interest and the maximum value in the pixel values of pixels having the same color as the pixel of interest in the processing unit area is equal to or larger than the threshold value calculated in Step S61. For example, the defect determining unit 45 determines whether the absolute value of a difference between the maximum value in the pixel values of the $R_0$ to $R_7$ of FIG. 6 and the pixel value of the pixel of interest is equal to or larger than the threshold value described above.

In Step S63, in the case where the defect determining unit 45 determines that the difference is equal to or larger than the threshold value, the processing proceeds to Step S64, and it is determined that the pixel of interest is a white-dot defective pixel.

In Step S63, in the case where the defect determining unit 45 determines that the difference is not equal to or larger than the threshold value, it is determined that the pixel of interest is not a defective pixel.

In Step S62, in the case where the defect determining unit 45 determines that the pixel of interest is not a candidate of the white-dot defective pixel, the processing proceeds to Step S65.

In Step S65, the defect determining unit 45 determines whether the pixel of interest is a candidate of the black-dot defective pixel or not. In the case where the defect determining unit 45 determines that the pixel of interest is a candidate of the black-dot defective pixel, the processing proceeds to Step S66. In Step S65, in the case where the defect determining unit 45 determines that the pixel of interest is not a candidate of the black-dot defective pixel, it is determined that the pixel of interest is not a defective pixel.

In Step S66, the defect determining unit 45 determines whether a difference between the minimum value in the pixel values of the pixels having the same color as the pixel of interest in the processing unit area and the pixel value of the pixel of interest is equal to or larger than the threshold value calculated in Step S61. For example, the defect determining unit 45 determines whether the absolute value of a difference between the minimum value in the pixel values of the $R_0$ to $R_7$ of FIG. 6 and the pixel value of the pixel of interest is equal to or larger than the threshold value described above.

In Step S66, in the case where the defect determining unit 45 determines that the difference is equal to or larger than the threshold value, the processing proceeds to Step S67, and it is determined that the pixel of interest is a black-dot defective pixel. In Step S66, in the case where the defect determining unit 45 determines that the difference is not equal to or larger than the threshold value, it is determined that the pixel of interest is not a defective pixel.

In such a manner, the defect determination processing in the flat state is executed.

Next, the detailed example of the defect correction processing in the flat state in Step S26 of FIG. 17 will be described with reference to the flowchart of FIG. 20.

In Step S81, it is determined whether the pixel of interest is a white-dot defective pixel or not. In the case where the pixel of interest is determined to be a white-dot defective pixel, the processing proceeds to Step S82.

In Step S82, the defect correcting unit 46 replaces the pixel value of the pixel of interest with a larger one of the pixel values of the pixels having the same color and exposure time as the pixel of interest in the processing unit area. At that time, for example, the pixel value of the pixel of interest is replaced with a larger one of the pixel values of the $R_3$ and the $R_4$ in FIG. 6.

On the other hand, in Step S81, in the case where it is determined that the pixel of interest is not a white-dot defective pixel, the processing proceeds to Step S83.

In Step S83, it is determined whether the pixel of interest is a black-dot defective pixel or not. In the case where the pixel of interest is determined to be a black-dot defective pixel, the processing proceeds to Step S84.

In Step S84, the defect correcting unit 46 replaces the pixel value of the pixel of interest with a smaller one of the pixel values of the pixels having the same color and exposure time as the pixel of interest in the processing unit area. At that time, for example, the pixel value of the pixel of interest is replaced with a smaller one of the pixel values of the $R_3$ and the $R_4$ in FIG. 6.

In such a manner, the defect correction processing in the flat state is executed.

Referring back to FIG. 17, in Step S24, in the case where the flatness determining unit 43 determines that the processing unit area is not flat, the processing proceeds to Step S27.

Figure 21:
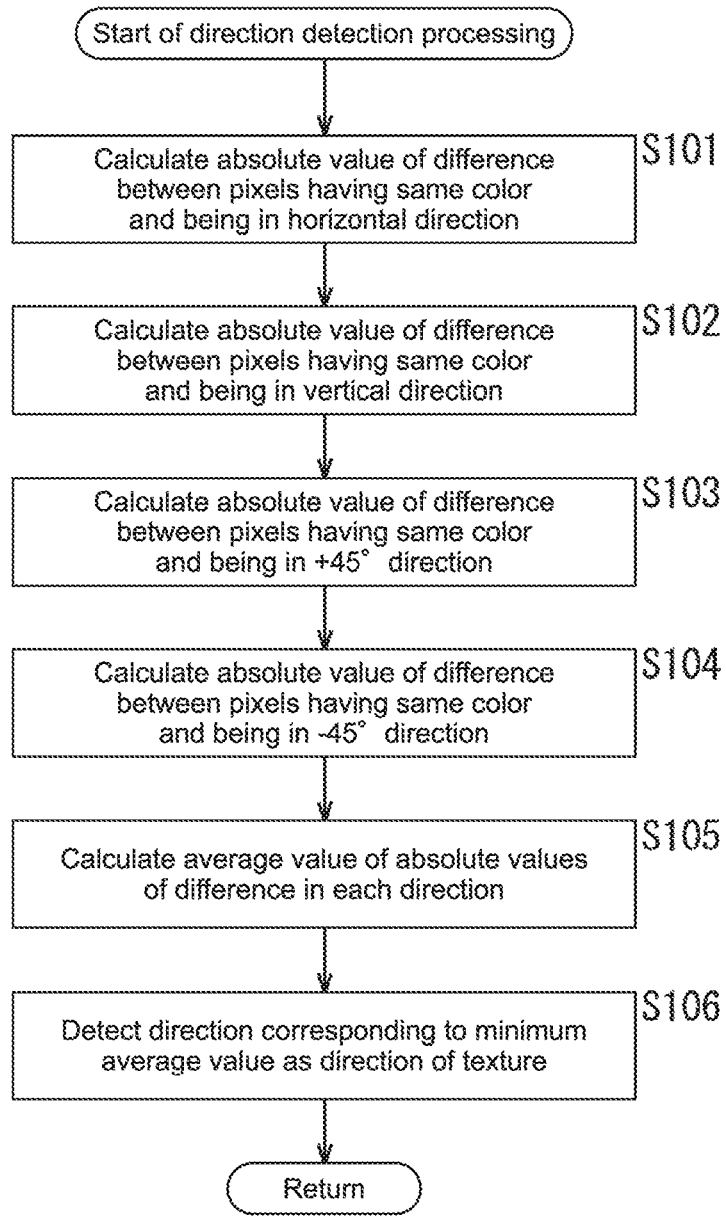
FIG. 21 is a flowchart for describing an example of direction detection processing.

In Step S27, the direction detecting unit 44 executes direction detection processing that will be described later with reference to FIG. 21. Through this processing, the direction of the texture is detected.

Figure 22:
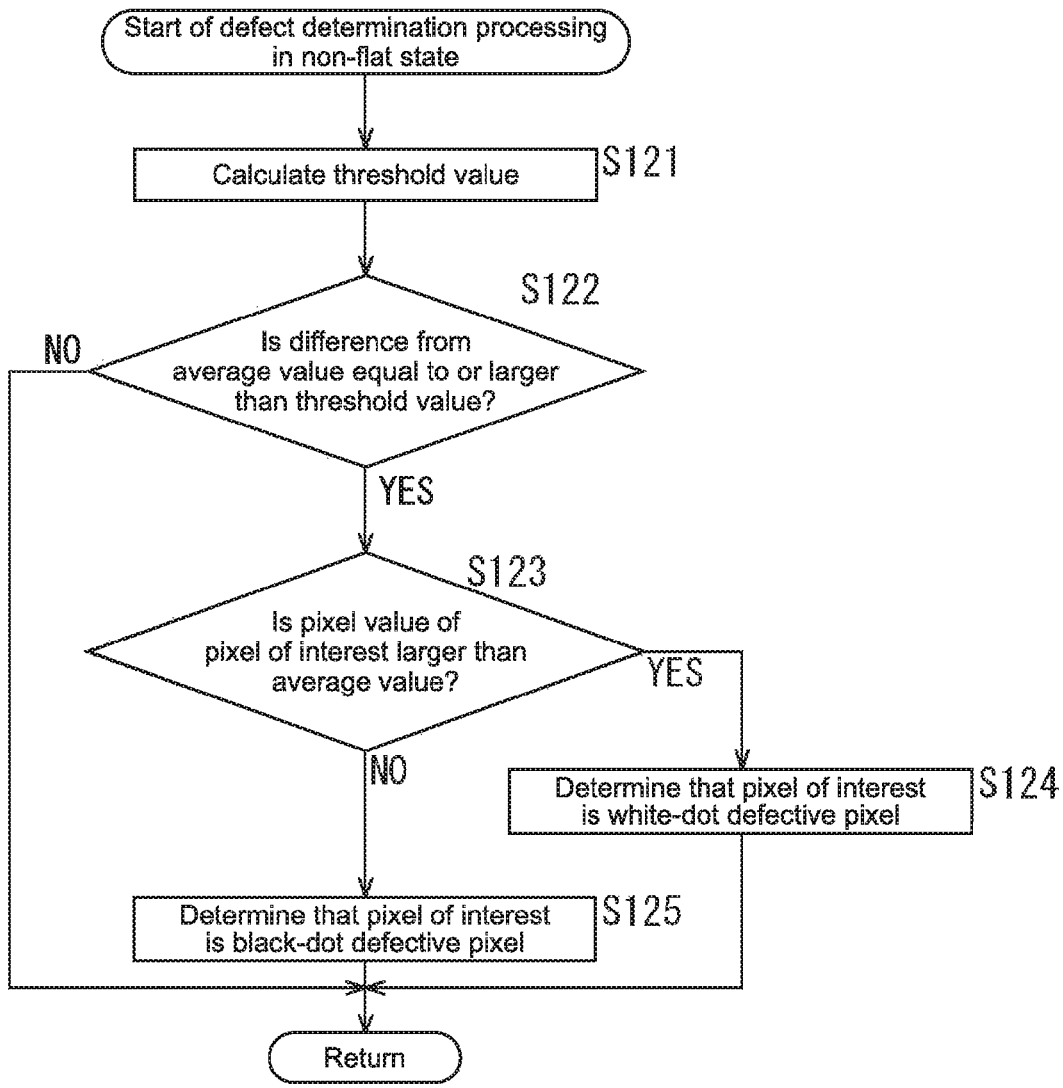
FIG. 22 is a flowchart for describing an example of defect determination processing in a non-flat state.

In Step S28, the defect determining unit 45 executes defect determination processing in a non-flat state that will be described later with reference to FIG. 22. Through this processing, it is determined whether the pixel of interest is a defective pixel or not.

Figure 23:
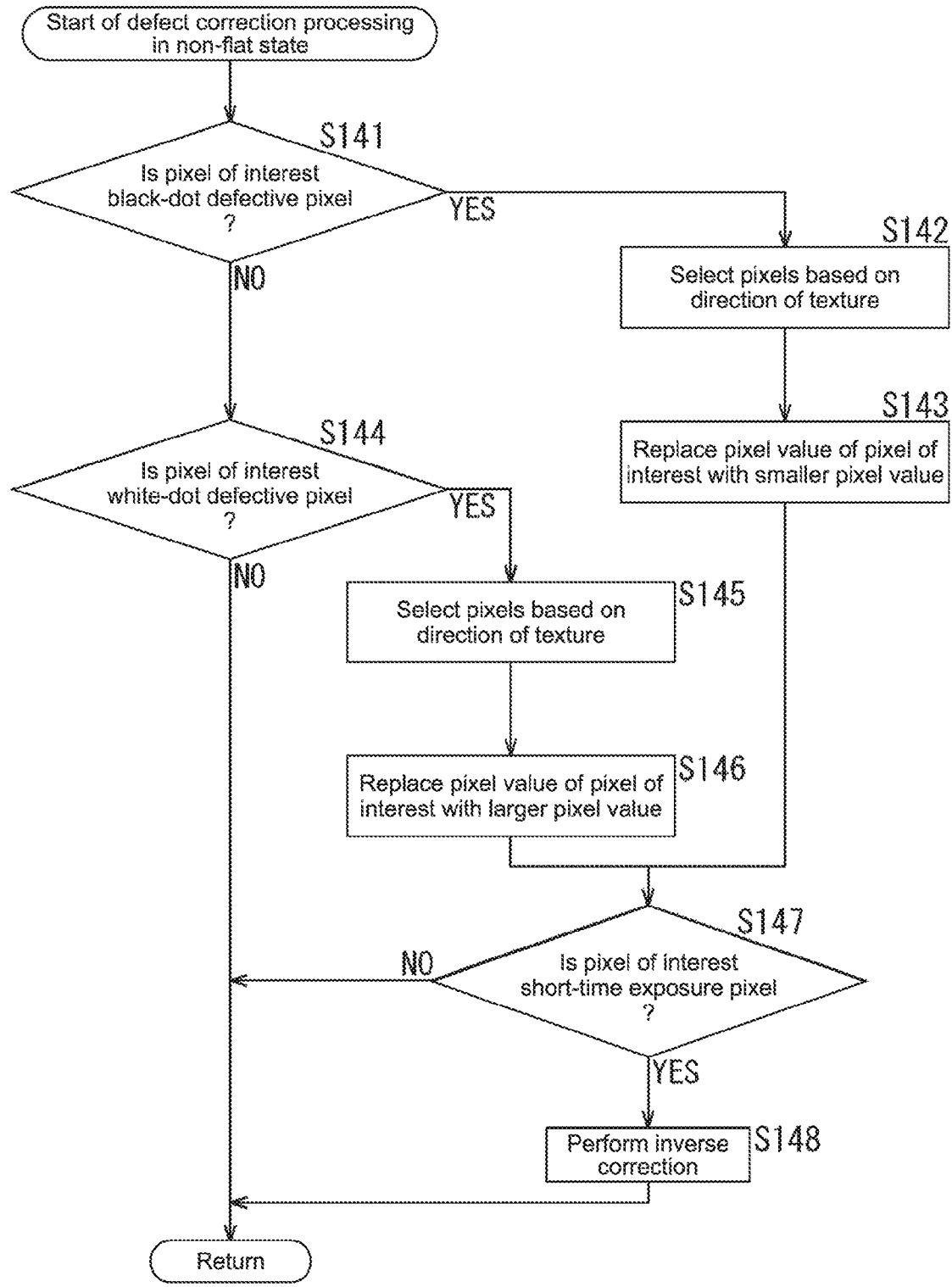
FIG. 23 is a flowchart for describing an example of defect correction processing in a non-flat state.

In Step S29, the defect correcting unit 46 executes defect correction processing in a non-flat state that will be described later with reference to FIG. 23. Through this processing, the pixel value of the pixel of interest as a defective pixel is corrected.

Here, a detailed example of the direction detection processing of Step S27 in FIG. 17 will be described with reference to the flowchart of FIG. 21.

In Step S101, the direction detecting unit 44 calculates absolute values of differences between pixels having the same color and being adjacent in the horizontal direction. At that time, the direction detecting unit 44 extracts a direction detection area that is formed of 35 (=7×5) pixels and is obtained by expanding the right and left ends of the processing unit area by one pixel. Subsequently, for example, as indicated by the arrows of the upper left part of FIG. 7, the absolute values of the differences between 15 sets of pixels, each set having the same color, are calculated.

In Step S102, the direction detecting unit 44 calculates absolute values of differences between pixels having the same color and being adjacent in the vertical direction. At that time, for example, as indicated by the arrows of the upper right part of FIG. 7, the absolute values of the differences between 15 sets of pixels, each set having the same color, are calculated.

In Step S103, the direction detecting unit 44 calculates absolute values of the differences between pixels having the same color and being adjacent in the +45° direction. At that time, for example, as indicated by the arrows of the lower left part of FIG. 7, the absolute values of the differences between 15 sets of pixels, each set having the same color, are calculated.

In Step S104, the direction detecting unit 44 calculates absolute values of the differences between pixels having the same color and being adjacent in the −45° direction. At that time, for example, as indicated by the arrows of the lower right part of FIG. 7, the absolute values of the differences between 15 sets of pixels, each set having the same color, are calculated.

In Step S105, the direction detecting unit 44 calculates an average value of the absolute values of the differences in each of the directions. At that time, as described above, in order to eliminate the influence of the defective pixel in the area, the direction detecting unit 44 selects 11 low-order absolute values of the differences from the 15 absolute values of the differences in each of the directions. Subsequently, the direction detecting unit 44 calculates an average value of the 11 absolute values of the differences in each of the directions. It should be noted that the average value of the 11 absolute values of the differences in the horizontal direction and the average value of the 11 absolute values of the differences in the vertical direction are each multiplied by $\sqrt{2}$.

In Step S106, the direction detecting unit 44 selects the minimum value of the 4 average values corresponding to the respective directions and detects a direction corresponding to the minimum value as the direction of the texture.

In such a manner, the direction detection processing is executed.

Next, a detailed example of the defect determination processing in the non-flat state in Step S28 of FIG. 17 will be described with reference to the flowchart of FIG. 22.

In Step S121, the defect determining unit 45 calculates the threshold value for the defect determination. At that time, for example, the threshold value is calculated by the expression (4).

In Step S122, the defect determining unit 45 determines whether a difference between the pixel value of the pixel of interest and the average value of the pixel values of pixels (for example, the $R_0$ to the $R_7$ in FIG. 6) having the same color in the processing unit area is equal to or larger than the threshold value described above. In Step S122, in the case where the defect determining unit 45 determines that the difference is not equal to or larger than the threshold value, it is determined that the pixel of interest is not a defective pixel. In Step S122, in the case where the defect determining unit 45 determines that the difference is equal to or larger than the threshold value, the processing proceeds to Step S123.

In Step S123, the defect determining unit 45 determines whether the pixel value of the pixel of interest is larger than the average value of the pixel values of the pixels having the same color in the processing unit area.

In Step S123, in the case where the defect determining unit 45 determines that the pixel value of the pixel of interest is larger than the average value of the pixel values of the pixels having the same color in the processing unit area, the processing proceeds to Step S124 and it is determined that the pixel of interest is a white-dot defective pixel.

In Step S123, in the case where the defect determining unit 45 determines that the pixel value of the pixel of interest is not larger (is smaller) than the average value of the pixel values of the pixels having the same color in the processing unit area, the processing proceeds to Step S125 and it is determined that the pixel of interest is a black-dot defective pixel.

In such a manner, the defect determination processing in the non-flat state is executed.

Next, a detailed example of the defect correction processing in the non-flat state in Step S29 of FIG. 17 will be described with reference to the flowchart of FIG. 23.

In Step S141, the defect correcting unit 46 determines whether the pixel of interest is a black-dot defective pixel or not. In the case where the defect correcting unit 46 determines that the pixel of interest is a black-dot defective pixel, the processing proceeds to Step S142.

In Step S142, the defect correcting unit 46 selects pixels to be used for the replacement of pixel values based on the detected direction of the texture as a result of the processing of Step S27.

In Step S143, the defect correcting unit 46 performs correction by replacing the pixel value of the pixel of interest with a smaller one of the pixel values of the pixels selected by the processing of Step S142.

On the other hand, in Step S141, in the case where the defect correcting unit 46 determines that the pixel of interest is not a black-dot defective pixel, the processing proceeds to Step S144.

In Step S144, the defect correcting unit 46 determines whether the pixel of interest is a white-dot defective pixel or not. In the case where the defect correcting unit 46 determines that the pixel of interest is a white-dot defective pixel, the processing proceeds to Step S145.

In Step S145, the defect correcting unit 46 selects pixels to be used for the replacement of pixel values based on the detected direction of the texture as a result of the processing of Step S27.

In Step S146, the defect correcting unit 46 performs correction by replacing the pixel value of the pixel of interest with a larger one of the pixel values of the pixels selected by the processing of Step S145.

For example, in the case where the direction of the texture is the horizontal direction, when it is determined that the pixel of interest is a white-dot defective pixel, the pixel value of the pixel of interest is replaced with a larger one of the pixel values of the $R_3$ and the $R_4$ of FIG. 6, and when it is determined that the pixel of interest is a black-dot defective pixel, the pixel value of the pixel of interest is replaced with a smaller one of the pixel values of the $R_3$ and the $R_4$ of FIG. 6. Further, in the case where the direction of the texture is the vertical direction, when it is determined that the pixel of interest is a white-dot defective pixel, the pixel value of the pixel of interest is replaced with a larger one of the pixel values of the $R_1$ and the $R_6$ of FIG. 6, and when it is determined that the pixel of interest is a black-dot defective pixel, the pixel value of the pixel of interest is replaced with a smaller one of the pixel values of the $R_1$ and the $R_6$ of FIG. 6. Additionally, in the case where the direction of the texture is the +45° direction, when it is determined that the pixel of interest is a white-dot defective pixel, the pixel value of the pixel of interest is replaced with a larger one of the pixel values of the $R_2$ and the $R_5$ of FIG. 6, and when it is determined that the pixel of interest is a black-dot defective pixel, the pixel value of the pixel of interest is replaced with a smaller one of the pixel values of the $R_2$ and the $R_5$ of FIG. 6. Additionally, in the case where the direction of the texture is the −45° direction, when it is determined that the pixel of interest is a white-dot defective pixel, the pixel value of the pixel of interest is replaced with a larger one of the pixel values of the $R_0$ and the $R_7$ of FIG. 6, and when it is determined that the pixel of interest is a black-dot defective pixel, the pixel value of the pixel of interest is replaced with a smaller one of the pixel values of the $R_0$ and the $R_7$ of FIG. 6.

In Step S147, the defect correcting unit 46 determines whether the pixel of interest is a short-time exposure pixel or not. In the case where the defect correcting unit 46 determines that the pixel of interest is a short-time exposure pixel, the processing proceeds to Step S148.

In Step S148, the defect correcting unit 46 multiplies the pixel value, which is replaced in Step S143 or S146, by a gain that is calculated as (exposure time of short-time exposure pixel/exposure time of long-time exposure pixel), and thus eliminates the influence of the correction by the gain correcting unit 41 (that is, inversely corrects the pixel value).

In such a manner, the defect correction processing in the non-flat state is executed.

Referring back to FIG. 17, in Step S22, in the case where it is determined that the processing unit area is saturated, the processing proceeds to Step S30.

Figure 24:
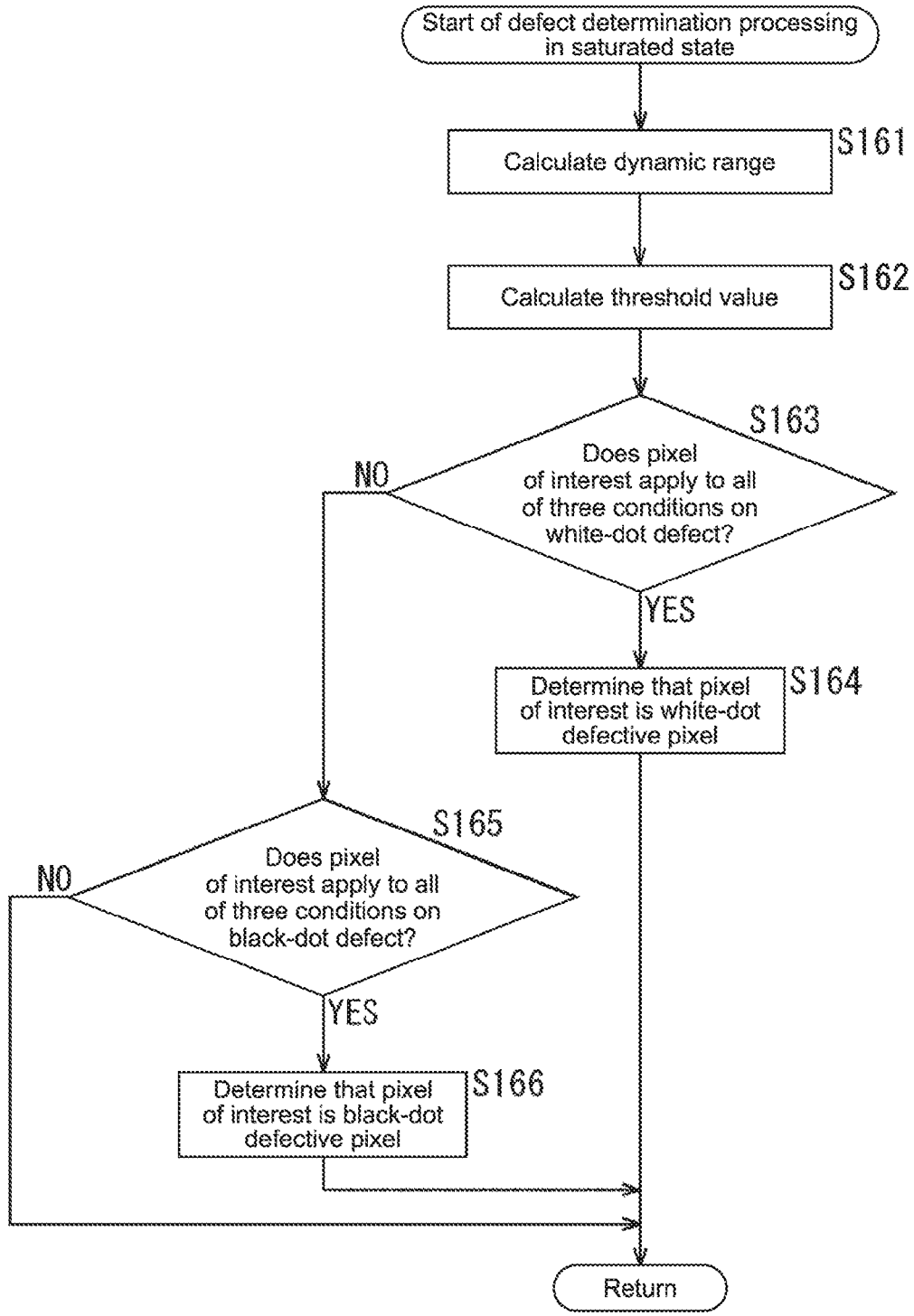
FIG. 24 is a flowchart for describing an example of defect determination processing in a saturated state.

In Step S30, the defect determining unit 45 executes defect determination processing in a saturated state that will be described later with reference to FIG. 24. Through this processing, it is determined whether the pixel of interest is a defective pixel or not.

Figure 25:
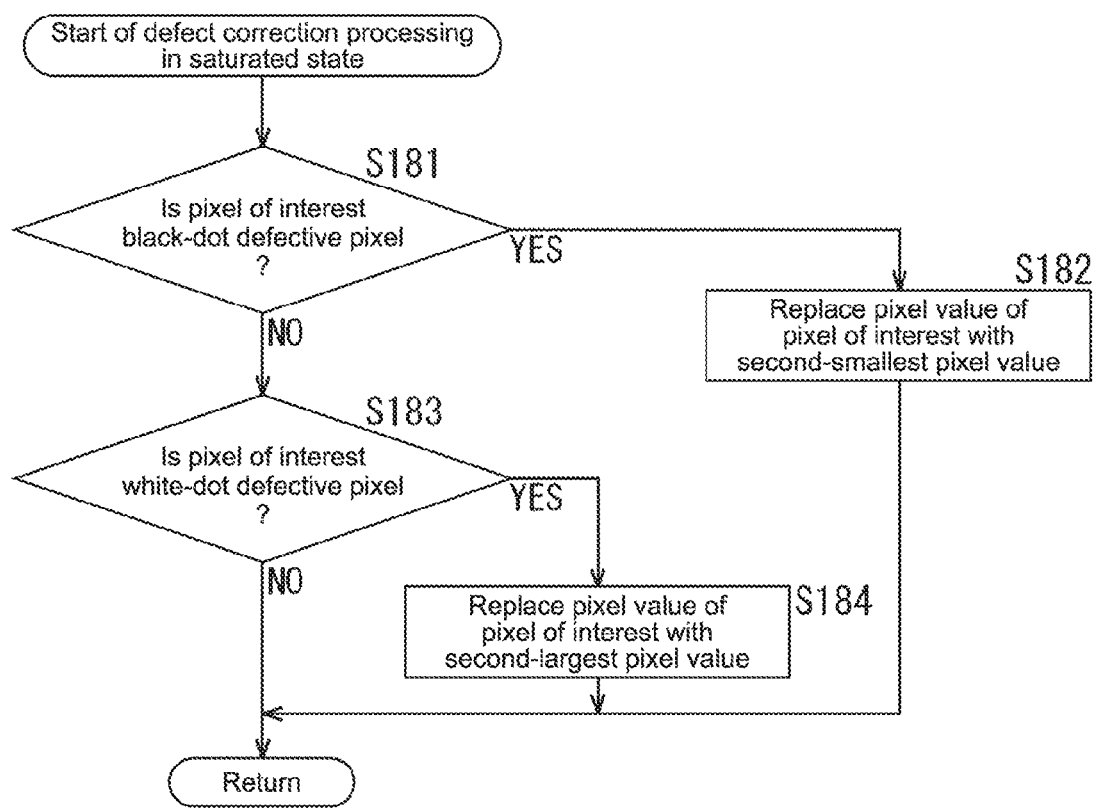
FIG. 25 is a flowchart for describing an example of defect correction processing in a saturated state.

In Step S31, the defect correcting unit 46 executes defect correction processing in a saturated state that will be described later with reference to FIG. 25. Through this processing, the pixel value of the pixel of interest as a defective pixel is corrected.

Here, a detailed example of the defect determination processing in the saturated state of Step S30 of FIG. 17 will be described with reference to the flowchart of FIG. 24.

In Step S161, the defect determining unit 45 calculates a dynamic range of 9 pixels that are arranged in the horizontal direction while centering on the pixel of interest.

At that time, for example, an area formed of 9 (1×9) pixels shown in FIG. 8 is extracted as a dynamic range detection area. It should be noted that when the saturation determining unit 42 determines that the processing unit area is saturated, a calculation using a pixel value before the correction by the gain correcting unit 41 is performed. Subsequently, for pixels having the same color as the pixel of interest and being indicated by the circles in FIG. 8 (in this example, R pixels), the defect determining unit 45 calculates 4 absolute values of differences between the pixel values of those pixels that are adjacent as indicated by the arrows in FIG. 8, and calculates a dynamic range in the 4 absolute values of the differences. Further, the defect determining unit 45 calculates a dynamic range of the pixel values of pixels having a color that is different from the color of the pixel of interest (in this example, G pixels).

In Step S162, the defect determining unit 45 calculates a threshold value for the defect determination. At that time, for example, the defect determining unit 45 calculates a square root of the average value of the pixel values of the pixels having the same color as the pixel of interest and being indicated by the circles in FIG. 8, and multiplies by a parameter or adding a parameter as appropriate, to set the resultant value as a threshold value for defect determination. Since first to third conditions are used for the threshold value as described later, three threshold values are calculated with changed parameters.

In Step S163, the defect determining unit 45 determines whether all of three conditions on white-dot defect are satisfied or not.

Specifically, the first condition is as follows: the pixel value of the pixel of interest is larger than the second-largest pixel value in the pixel values of the 4 pixels having the same color and being indicated by the circles in FIG. 8, and a difference between the pixel value of the pixel of interest and the second-largest pixel value in the pixel values of the 4 pixels indicated by the circles in FIG. 8 is larger than the threshold value.

In consideration of the case where defective pixels having the same color alternately exist, like the order of a defective pixel, a non-defective pixel, a defective pixel, . . . , for example, a difference between the pixel value of the pixel of interest and the largest pixel value is not compared with the threshold value, and the difference between the pixel value of the pixel of interest and the second-largest pixel value is compared with the threshold value.

The second condition is as follows: the dynamic range in the absolute values of the differences between the pixel values of the adjacent pixels having the same color as the pixel of interest and being indicated by the circles in FIG. 8 is larger than the threshold value.

The third condition is as follows: the dynamic range of the pixel values of pixels having a color that is different from the color of the pixel of interest shown in FIG. 8 (in FIG. 8, G pixels) is smaller than the threshold value.

In Step S163, in the case where all of the first to third conditions described above are satisfied, the processing proceeds to Step S164 and it is determined that the pixel of interest is a white-dot defective pixel.

In Step S163, in the case where at least one of the three conditions on the white-dot defect is not satisfied, the processing proceeds to Step S165.

In Step S165, the defect determining unit 45 determines whether all of three conditions on black-dot defect are satisfied or not.

Specifically, the first condition is as follows: the pixel value of the pixel of interest is smaller than the second-smallest pixel value in the pixel values of the 4 pixels having the same color and being indicated by the circles in FIG. 8, and a difference between the pixel value of the pixel of interest and the second-smallest pixel value in the pixel values of the 4 pixels indicated by the circles in FIG. 8 is larger than the threshold value.

The second and third conditions are the same as in the case of the white-dot defective pixel, and thus their detailed description will be omitted.

In Step S165, in the case where all of the first to third conditions described above are satisfied, the processing proceeds to Step S166 and it is determined that the pixel of interest is a black-dot defective pixel.

In Step S165, in the case where at least one of the three conditions on the black-dot defect is not satisfied, this means that the pixel of interest is determined not to be a defective pixel.

In such a manner, the defect determination processing in the saturated state is executed.

Next, a detailed example of the defect correction processing in the saturated state of Step S31 of FIG. 17 will be described with reference to the flowchart of FIG. 25.

In Step S181, the defect correcting unit 46 determines whether the pixel of interest is a black-dot defective pixel or not as a result of the processing of Step S30.

In Step S181, in the case where the defect correcting unit 46 determines that the pixel of interest is a black-dot defective pixel, the processing proceeds to Step S182.

In Step S182, the defect correcting unit 46 replaces the pixel value of the pixel of interest with the second-smallest pixel value in the pixel values of the pixels having the same color as the pixel of interest and being indicated by the circles in FIG. 8.

On the other hand, in Step S181, in the case where the defect correcting unit 46 determines that the pixel of interest is not a black-dot defective pixel, the processing proceeds to Step S183.

In Step S183, the defect correcting unit 46 determines whether the pixel of interest is a white-dot defective pixel or not as a result of the processing of Step S30. In Step S183, in the case where the defect correcting unit 46 determines that the pixel of interest is a white-dot defective pixel, the processing proceeds to Step S184.

In Step S184, the defect correcting unit 46 replaces the pixel value of the pixel of interest with the second-largest pixel value in the pixel values of the pixels having the same color as the pixel of interest and being indicated by the circles in FIG. 8.

In such a manner, the defect correction processing in the saturated state is executed.

As described above, the defect correction processing in the row exposure array is executed.

Next, the example of the defect correction processing in the uniform exposure array by the defect correction processing unit 21 will be described with reference to the flowchart of FIG. 26.

In Step S201, the gain correcting unit 41 performs correction for adjusting a difference caused by the difference in exposure time on the pixel values of the input image. For example, the gain correcting unit 41 multiplies the pixel value of the short-time exposure pixel by a gain that is calculated as (exposure time of long-time exposure pixel/exposure time of short-time exposure pixel). This allows the pixel value of the short-time exposure pixel to be corrected to a pixel value corresponding to the long-time exposure.

It should be noted that in the processing subsequent to Step S201, not only a pixel value after the correction by the gain correcting unit 41 but also a pixel value before the correction can be referred to as appropriate.

In Step S202, the saturation determining unit 42 determines whether the pixel values are saturated or not for a processing unit area that is an area having a predetermined number of pixels centering on the pixel of interest. Specifically, the saturation determining unit 42 determines whether the processing unit area corresponds to a significantly bright area in the image or not.

At that time, for example, in the case where the number of pixels whose pixel values are the maximum values is equal to or larger than a preset threshold value, it is determined that the processing unit area is saturated. For example, in the case where the number of pixels whose pixel values are the maximum values is 3 (threshold value) or more, it is determined that the processing unit area is saturated.

In Step S202, in the case where the saturation determining unit 42 determines that the processing unit area is not saturated, the processing proceeds to Step S203.

In Step S203, the flatness determining unit 43 executes flatness determination processing in an unsaturated state that will be described later with reference to FIG. 18. Through this processing, it is determined whether the processing unit area is flat or not.

Figure 17:
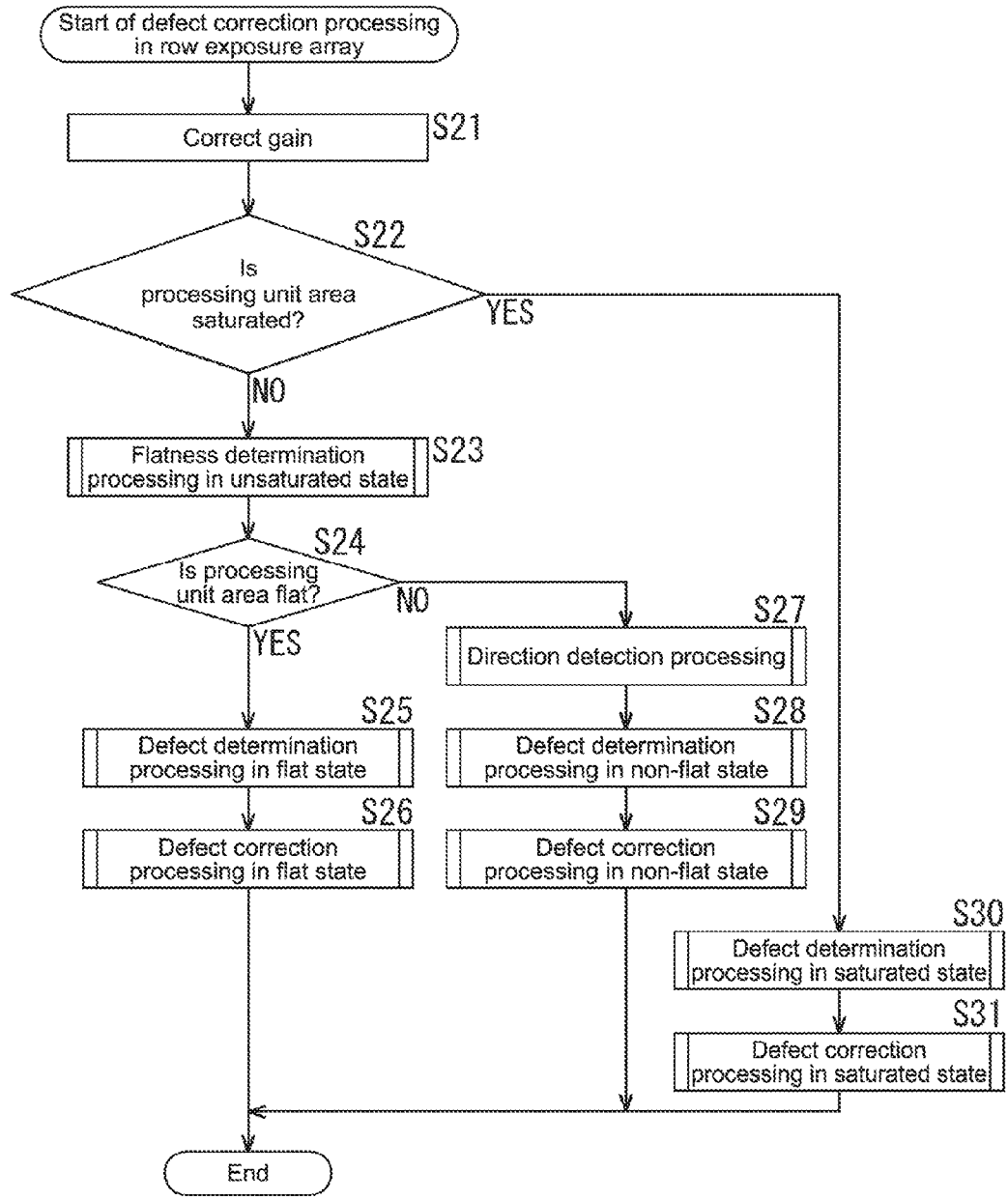
FIG. 17 is a flowchart for describing an example of defect correction processing in the row exposure array.
Figure 26:
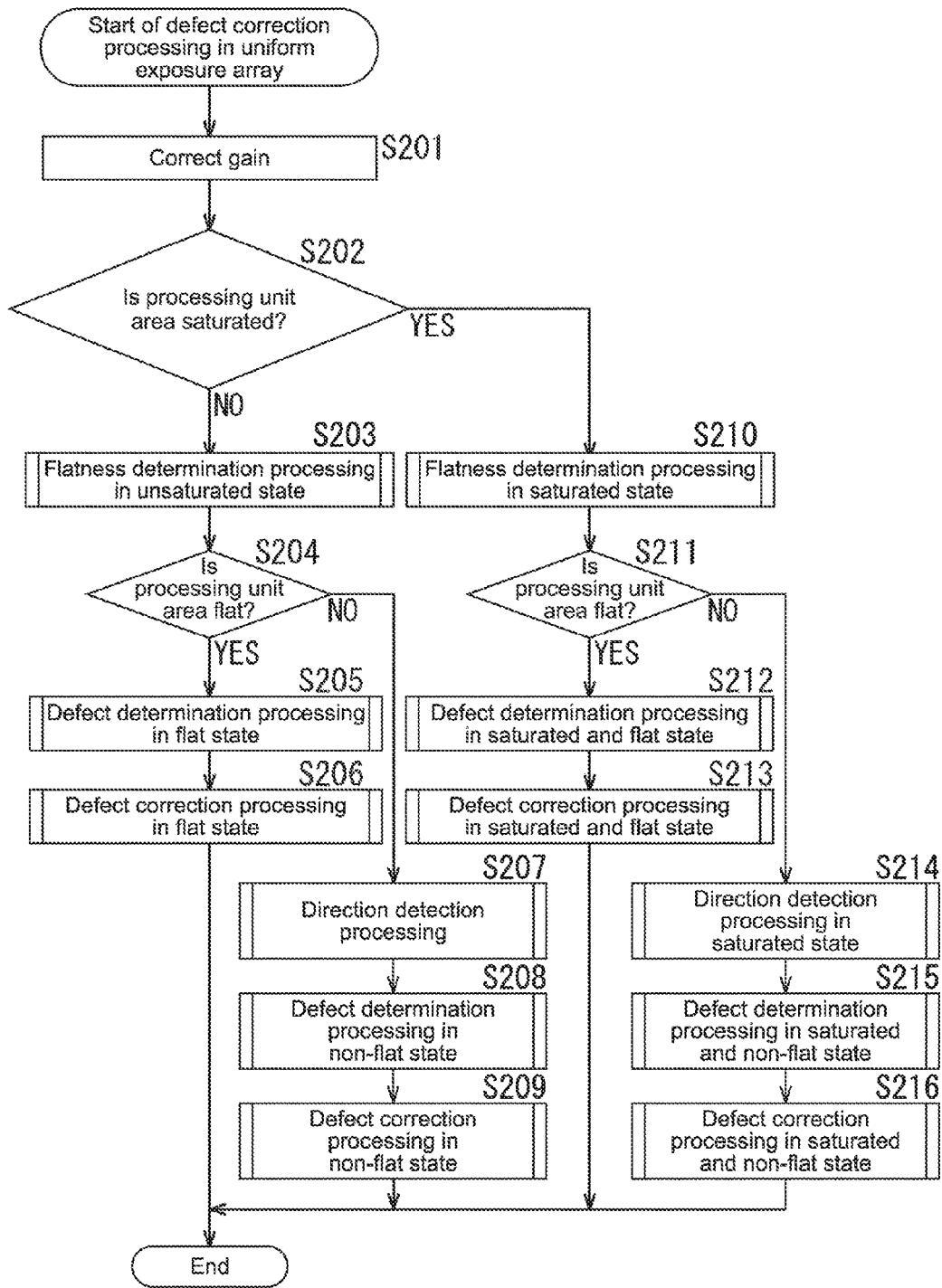
FIG. 26 is a flowchart for describing an example of defect correction processing in the uniform exposure array.

The processing of Step S203 of FIG. 26 is the same as the processing of Step S23 of FIG. 17, and thus its detailed description will be omitted. However, in Step S203, when the pixel of interest is a G pixel, it is assumed that pixels having the same color as the pixel of interest are disposed in the processing unit area as shown in FIG. 11. Specifically, in the processing unit area, all the pixels having the same color as the pixel of interest have the same exposure time (in this example, short-time exposure pixels).

Consequently, in Step S203, when the pixel of interest is a G pixel, a calculation using a pixel value before correction by the gain correcting unit 41 is performed. Further, three threshold values, that is, a threshold value for an R or B pixel, a threshold value for a G long-time exposure pixel, and a threshold value for a G short-time exposure pixel, are prepared as threshold values used for determining whether the processing unit area is flat or not.

In Step S204, the flatness determining unit 43 determines whether the result of the determination in Step S203 is "flat" or not. In the case where the result of the determination in Step S23 is "flat", the processing proceeds to Step S205.

In Step S205, the defect determining unit 45 executes defect determination processing in a flat state. Through this processing, it is determined whether the pixel of interest is a defective pixel or not.

The processing of Step S205 is the same as the processing of Step S25 of FIG. 17, and thus its detailed description will be omitted. In Step S205, however, when a threshold value for defect determination is calculated, the defect determining unit 45 calculates three threshold values, that is, a threshold value for an R or B pixel, a threshold value for a G long-time exposure pixel, and a threshold value for a G short-time exposure pixel.

In Step S206, the defect correcting unit 46 executes defect correction processing in a flat state. Through this processing, the pixel value of the pixel of interest as a defective pixel is corrected.

The processing of Step S206 is the same as the processing of Step S26 of FIG. 17, and thus its detailed description will be omitted. In Step S206, however, when the pixel of interest is an R pixel, the $R_0$, $R_2$, $R_5$, or $R_7$ in FIG. 10 is used as a pixel to be replaced, and when the pixel of interest is a G pixel, the $G_0$ to $G_7$ in FIG. 11 are used as a pixel to be replaced. It should be noted that when the pixel of interest is a B pixel, as in the case where the pixel of interest is an R pixel, a pixel having the same color and exposure time as the pixel of interest in the processing unit area is used.

On the other hand, in Step S204, in the case where the flatness determining unit 43 determines that the processing unit area is not flat, the processing proceeds to Step S207.

In Step S207, the direction detecting unit 44 executes direction detection processing. Through this processing, the direction of the texture is detected.

In Step S208, the defect determining unit 45 executes defect determination processing in a non-flat state. Through this processing, it is determined whether the pixel of interest is a defective pixel or not.

In Step S209, the defect correcting unit 46 executes defect correction processing in a non-flat state. Through this processing, the pixel value of the pixel of interest as a defective pixel is corrected.

The processing from Step S207 to Step S209 is the same as the processing from Step S27 to Step S29 of FIG. 17, and thus their detailed description will be omitted.

On the other hand, in Step S202, in the case where the saturation determining unit 42 determines that the processing unit area is saturated, the processing proceeds to Step S210.

In Step S210, the flatness determining unit 43 executes flatness determination processing in a saturated state. Through this processing, it is determined whether the processing unit area is flat or not.

Figure 27:
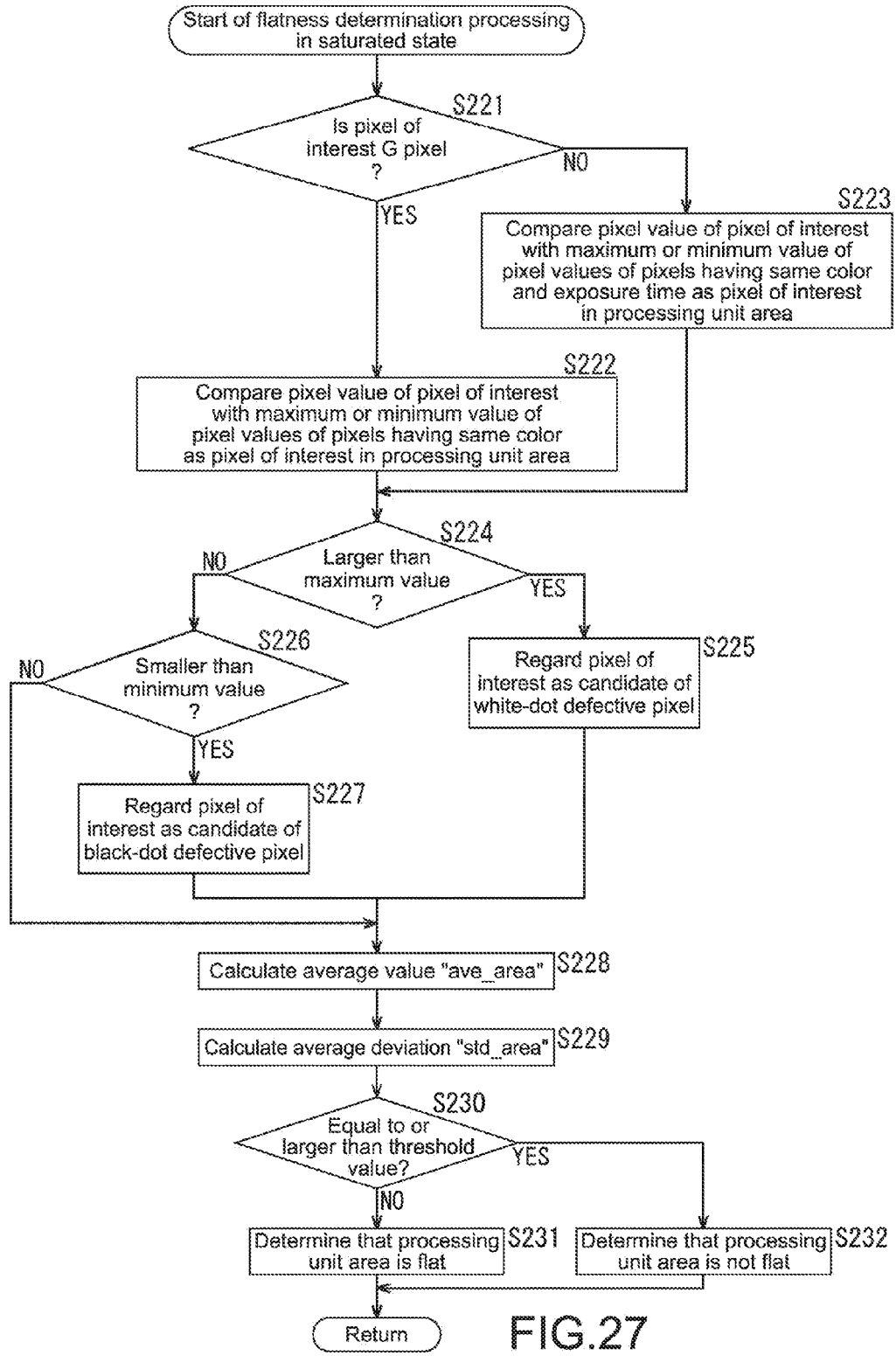
FIG. 27 is a flowchart for describing an example of flatness determination processing in a saturated state.

Here, a detailed example of the flatness determination processing in the saturated state of Step S210 of FIG. 26 will be described with reference to the flowchart of FIG. 27.

In Step S221, the flatness determining unit 43 determines whether the pixel of interest is a G pixel or not. In the case where the flatness determining unit 43 determines that the pixel of interest is a G pixel, the processing proceeds to Step S222.

In Step S222, the flatness determining unit 43 compares the pixel value of the pixel of interest with the maximum or minimum value in the pixel values of pixels having the same color as the pixel of interest in the processing unit area.

On the other hand, in Step S221, in the case where the flatness determining unit 43 determines that the pixel of interest is not a G pixel (specifically, the pixel of interest is an R or B pixel), the processing proceeds to Step S223.

In Step S223, the flatness determining unit 43 compares the pixel value of the pixel of interest with the maximum or minimum value in the pixel values of 4 pixels having the same color and exposure time as the pixel of interest and being indicated by the circles in FIG. 12, for example.

In Step S224, as a result of the comparison in Step S222 or Step S223, the flatness determining unit 43 determines whether the pixel value of the pixel of interest is larger than the maximum value or not. In Step S224, in the case where the flatness determining unit 43 determines that the pixel value of the pixel of interest is larger than the maximum value, the processing proceeds to Step S225.

In Step S225, the pixel of interest is regarded as a candidate of the white-dot defective pixel and a predetermined flag or the like is set therefor.

On the other hand, in Step S224, as a result of the comparison in Step S222 or Step S223, in the case where the flatness determining unit 43 determines that the pixel value of the pixel of interest is not larger than the maximum value, the processing proceeds to Step S226.

In Step S226, as a result of the comparison in Step S222 or Step S223, the flatness determining unit 43 determines whether the pixel value of the pixel of interest is smaller than the minimum value or not. In Step S226, in the case where the flatness determining unit 43 determines that the pixel value of the pixel of interest is smaller than the minimum value, the processing proceeds to Step S227.

In Step S227, the pixel of interest is regarded as a candidate of the black-dot defective pixel and a predetermined flag or the like is set therefor.

In Step S226, in the case where the flatness determining unit 43 determines that the pixel value of the pixel of interest is not smaller than the minimum value, the processing of Step S227 is skipped.

In Step S228, the flatness determining unit 43 calculates an average value "ave_area" of the pixel values of the pixels having the same color as the pixel of interest. At that time, the average value "ave_area" is calculated by the expression (5), for example.

In Step S229, the flatness determining unit 43 calculates an average deviation "std_area" of the processing unit area by using the result of the calculation in Step S228. At that time, the average deviation "std_area" is calculated by the expression (6), for example.

In Step S230, the flatness determining unit 43 determines whether the average deviation "std_area" calculated in the processing of Step S229 is equal to or larger than a preset threshold value.

It should be noted that in Step S230, 4 threshold values, that is, a threshold value for an R or B long-time exposure pixel, a threshold value for an R or B short-time exposure pixel, a threshold value for a G long-time exposure pixel, and a threshold value for a G short-time exposure pixel, are prepared as threshold values used for determining whether the processing unit area is flat or not.

In Step S230, in the case where the flatness determining unit 43 determines that the average deviation "std_area" is smaller than the threshold value, the processing proceeds to Step S231 and the flatness determining unit 43 determines that the processing unit area is flat.

In Step S230, in the case where the flatness determining unit 43 determines that the average deviation "std_area" is equal to or larger than the threshold value, the processing proceeds to Step S232 and the flatness determining unit 43 determines that the processing unit area is not flat.

In such a manner, the flatness determination processing in the saturated state is executed.

Referring back to FIG. 26, in Step S211, the flatness determining unit 43 determines whether the processing unit area is flat or not as a result of the processing of Step S210. In the case where the processing unit area is determined to be flat, the processing proceeds to Step S212.

In Step S212, the defect determining unit 45 executes defect determination processing in a saturated and flat state. Through this processing, it is determined whether the pixel of interest is a defective pixel or not.

The processing of Step S212 is the same as the processing of Step S25 of FIG. 17, and thus its detailed description will be omitted. In Step S212, however, when a threshold value for defect determination is calculated, the defect determining unit 45 calculates three threshold values, that is, a threshold value for an R or B pixel, a threshold value for a G long-time exposure pixel, and a threshold value for a G short-time exposure pixel.

In Step S213, the defect correcting unit 46 executes defect correction processing in a saturated and flat state. Through this processing, the pixel value of the pixel of interest as a defective pixel is corrected.

The processing of Step S213 is the same as the processing of Step S26 of FIG. 17, and thus its detailed description will be omitted. In Step S206, however, when the pixel of interest is an R pixel, the $R_0$, $R_2$, $R_5$, or $R_7$ in FIG. 10 is used as a pixel to be replaced, and when the pixel of interest is a G pixel, the $G_0$ to $G_7$ in FIG. 11 are used as a pixel to be replaced. It should be noted that when the pixel of interest is a B pixel, as in the case where the pixel of interest is an R pixel, a pixel having the same color and exposure time as the pixel of interest in the processing unit area is used.

On the other hand, in Step S211, in the case where the flatness determining unit 43 determines that the processing unit area is not flat as a result of the processing of Step S210, the processing proceeds to Step S214.

In Step S214, the direction detecting unit 44 executes direction detection processing in a saturated state. Through this processing, the direction of the texture is detected.

The processing of Step S214 is the same as the processing of Step S27 in FIG. 17.

In Step S214, since it is thought that the long-time exposure pixels are saturated, the direction detection using only G short-time exposure pixels is performed.

Specifically, the direction detecting unit 44 extracts a direction detection area that is formed of 35 (=7×5) pixels and is obtained by expanding the right and left ends of the processing unit area by one pixel. The direction detecting unit 44 calculates absolute values of differences between adjacent G pixels in the direction detection area. At that time, as shown in FIG. 13, the direction detecting unit 44 calculates absolute values of differences between adjacent G pixels in each of 4 directions, that is, a horizontal direction, a vertical direction, a +45° direction, and −45° direction.

Subsequently, in order to eliminate the influence of the defective pixel in the area, the direction detecting unit 44 selects 4 low-order absolute values of differences from the absolute values of the differences in each of the directions and calculates an average value of the 4 absolute values of the differences in each of the directions. It should be noted that the average value of the 4 absolute values of the differences in the horizontal direction and the average value of the 4 absolute values of the differences in the vertical direction are each multiplied by √2.

Additionally, the direction detecting unit 44 selects the minimum value of the 4 average values corresponding to the respective directions and detects a direction corresponding to the minimum value as the direction of the texture.

In the case where the pixel of interest is a G short-time exposure pixel or a B pixel, when an area formed of 35 (=7×5) pixels in which the number of G short-time exposure pixels becomes the largest is extracted, the position of the pixel of interest does not come to the center of the area. In such a case, the result of the direction detection with a pixel located on the left of the pixel of interest being at the center is used.

Figure 28:
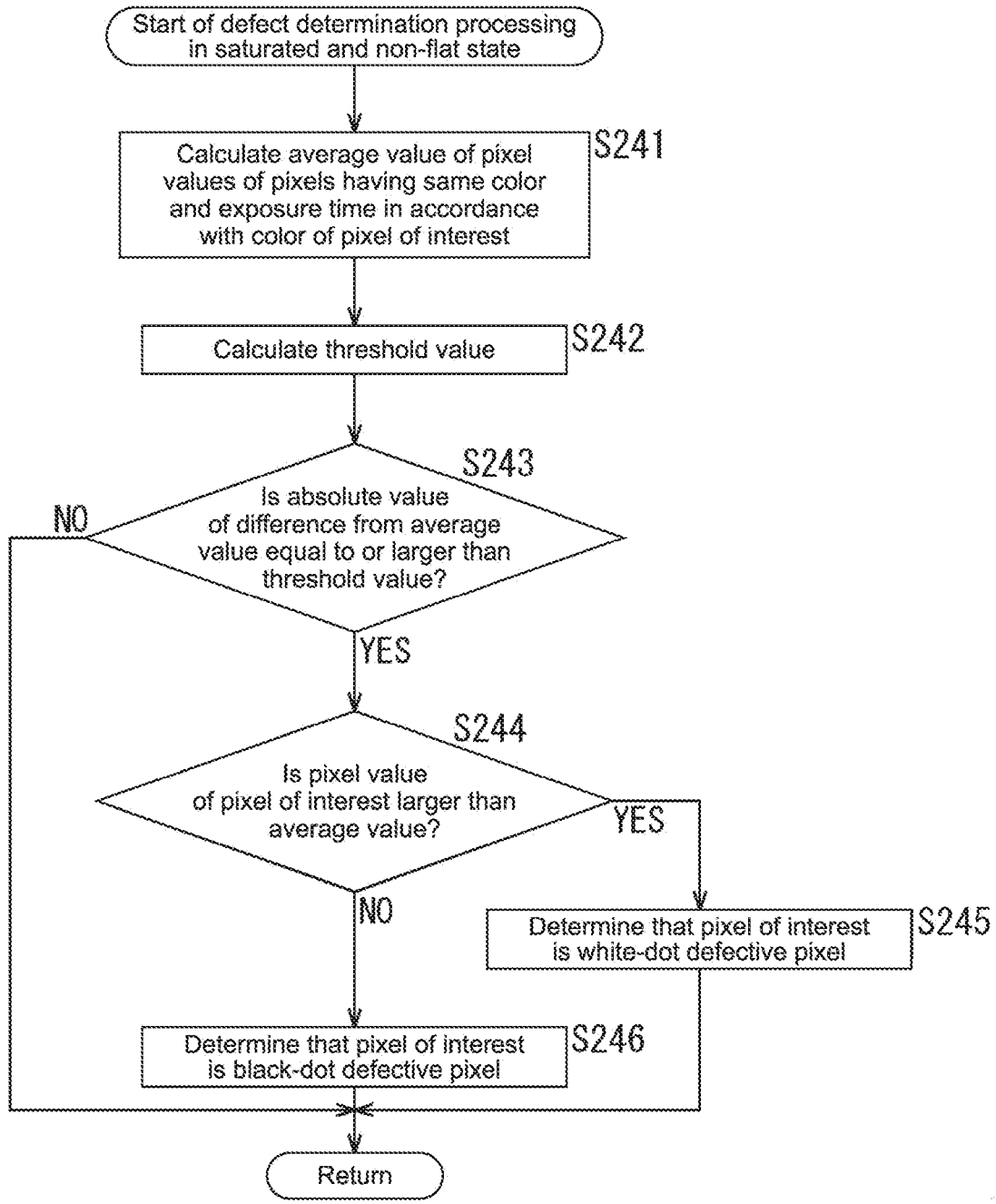
FIG. 28 is a flowchart for describing an example of defect determination processing in a saturated and non-flat state.

In Step S215, the defect determining unit 45 executes defect determination processing in a saturated and non-flat state that will be described later with reference to FIG. 28. Through this processing, it is determined whether the pixel of interest is a defective pixel or not.

Figure 29:
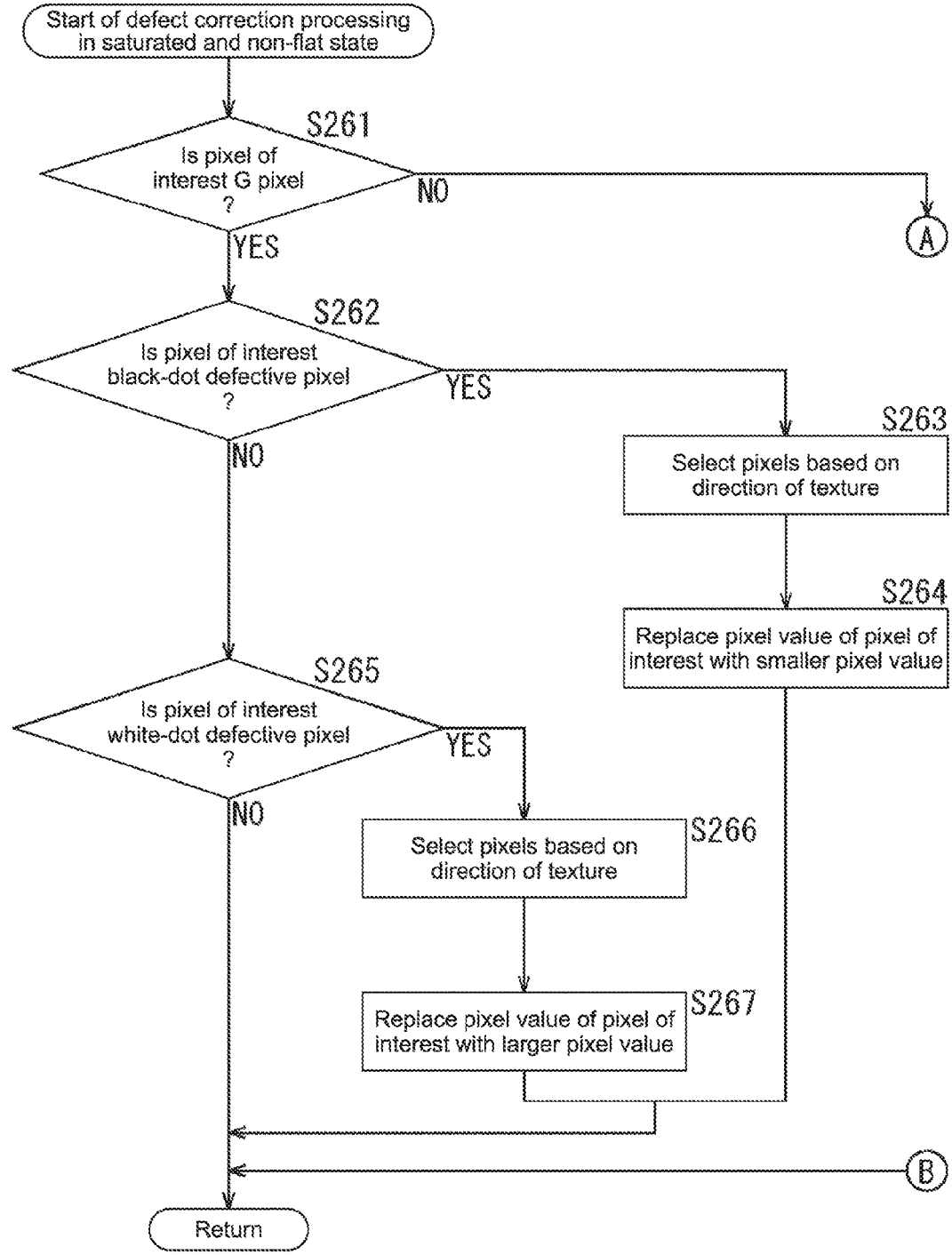
FIG. 29 is a flowchart for describing an example of defect correction processing in a saturated and non-flat state.

In Step S216, the defect correcting unit 46 executes defect correction processing in a saturated and non-flat state that will be described later with reference to FIGS. 29 to 31. Through this processing, the pixel value of the pixel of interest as a defective pixel is corrected.

Here, a detailed example of the defect determination processing in the saturated and non-flat state of Step S215 in FIG. 26 will be described with reference to the flowchart of FIG. 28.

In Step S241, the defect determining unit 45 calculates an average value of the pixel values of pixels having the same color and exposure time as the pixel of interest in accordance with the color of the pixel of interest.

For example, in the case where the pixel of interest is an R or B pixel, the defect determining unit 45 calculates an average value of the pixel values of 4 pixels, which are located at positions expressed in white and indicated by the circles in FIG. 10. In the case where the pixel of interest is a G pixel, the defect determining unit 45 calculates an average value of the pixel values of 8 pixels, which are located at positions indicated by the circles in FIG. 11.

In Step S242, the defect determining unit 45 calculates a threshold value for defect determination. At that time, the defect determining unit 45 calculates a threshold value by using a square root of the average value calculated in Step S241 and using the average value corresponding to the direction detected by the direction detecting unit 44 in the processing of Step S214 (the average value of the 4 absolute values of the differences). It should be noted that here, three threshold values, that is, a threshold value for an R or B pixel, a threshold value for a G long-time exposure pixel, and a threshold value for a G short-time exposure pixel are calculated.

In Step S243, the defect determining unit 45 determines whether an absolute value of a difference between the average value calculated in Step S241 and the pixel value of the pixel of interest is equal to or larger than the threshold value calculated in Step S242. In Step S243, in the case where the defect determining unit 45 determines that the absolute value of the difference is not equal to or larger than the threshold value, it is determined that the pixel of interest is not a defective pixel.

In Step S243, in the case where the defect determining unit 45 determines that the absolute value of the difference is equal to or larger than the threshold value, the processing proceeds to Step S244.

In Step S244, the defect determining unit 45 determines whether the pixel value of the pixel of interest is larger than the average value calculated in Step S241 or not.

In Step S244, in the case where the defect determining unit 45 determines that the pixel value of the pixel of interest is larger than the average value calculated in Step S241, the processing proceeds to Step S245 and it is determined that the pixel of interest is a white-dot defective pixel.

On the other hand, in Step S244, in the case where the defect determining unit 45 determines that the pixel value of the pixel of interest is smaller than the average value calculated in Step S241, the processing proceeds to Step S246 and it is determined that the pixel of interest is a black-dot defective pixel.

In such a manner, the defect determination processing in the saturated and non-flat state is executed.

Next, a detailed example of the defect correction processing in the saturated and non-flat state in Step S216 of FIG. 26 will be described with reference to the flowcharts of FIGS. 29 to 31.

In Step S261, the defect correcting unit 46 determines whether the pixel of interest is a G pixel or not. In the case where the defect correcting unit 46 determines that the pixel of interest is a G pixel, the processing proceeds to Step S262.

In Step S262, the defect correcting unit 46 determines whether the pixel of interest is a black-dot defective pixel or not. In the case where the defect correcting unit 46 determines that the pixel of interest is a black-dot defective pixel, the processing proceeds to Step S263.

In Step S263, the defect correcting unit 46 selects pixels to be used for the replacement of pixel values based on the detected direction of the texture as a result of the processing of Step S214.

In Step S264, the defect correcting unit 46 performs correction by replacing the pixel value of the pixel of interest with a smaller one of the pixel values of the pixels selected by the processing of Step S263.

On the other hand, in Step S262, in the case where the defect correcting unit 46 determines that the pixel of interest is not a black-dot defective pixel, the processing proceeds to Step S265.

In Step S265, the defect correcting unit 46 determines whether the pixel of interest is a white-dot defective pixel or not. In the case where the defect correcting unit 46 determines that the pixel of interest is a white-dot defective pixel, the processing proceeds to Step S266.

In Step S266, the defect correcting unit 46 selects pixels to be used for the replacement of pixel values based on the detected direction of the texture as a result of the processing of Step S214.

In Step S267, the defect correcting unit 46 performs correction by replacing the pixel value of the pixel of interest with a larger one of the pixel values of the pixels selected by the processing of Step S266.

In the processing of Steps S262 to S267, for example, in the case where the direction of the texture is the horizontal direction, the $G_3$ and the $G_4$ of FIG. 11 are selected. Further, in the case where the direction of the texture is the vertical direction, the $G_1$ and the $G_6$ of FIG. 11 are selected. Furthermore, in the case where the direction of the texture is the +45° direction, the $G_2$ and the $G_5$ of FIG. 11 are selected. Additionally, in the case where the direction of the texture is the −45° direction, the $G_0$ and the $G_7$ of FIG. 11 are selected.

When it is determined that the pixel of interest is a white-dot defective pixel, the pixel value of the pixel of interest is replaced with a larger one of the pixel values of the two pixels selected as described above. Further, when it is determined that the pixel of interest is a black-dot defective pixel, the pixel value of the pixel of interest is replaced with a smaller one of the pixel values of the two pixels selected as described above.

Figure 30:
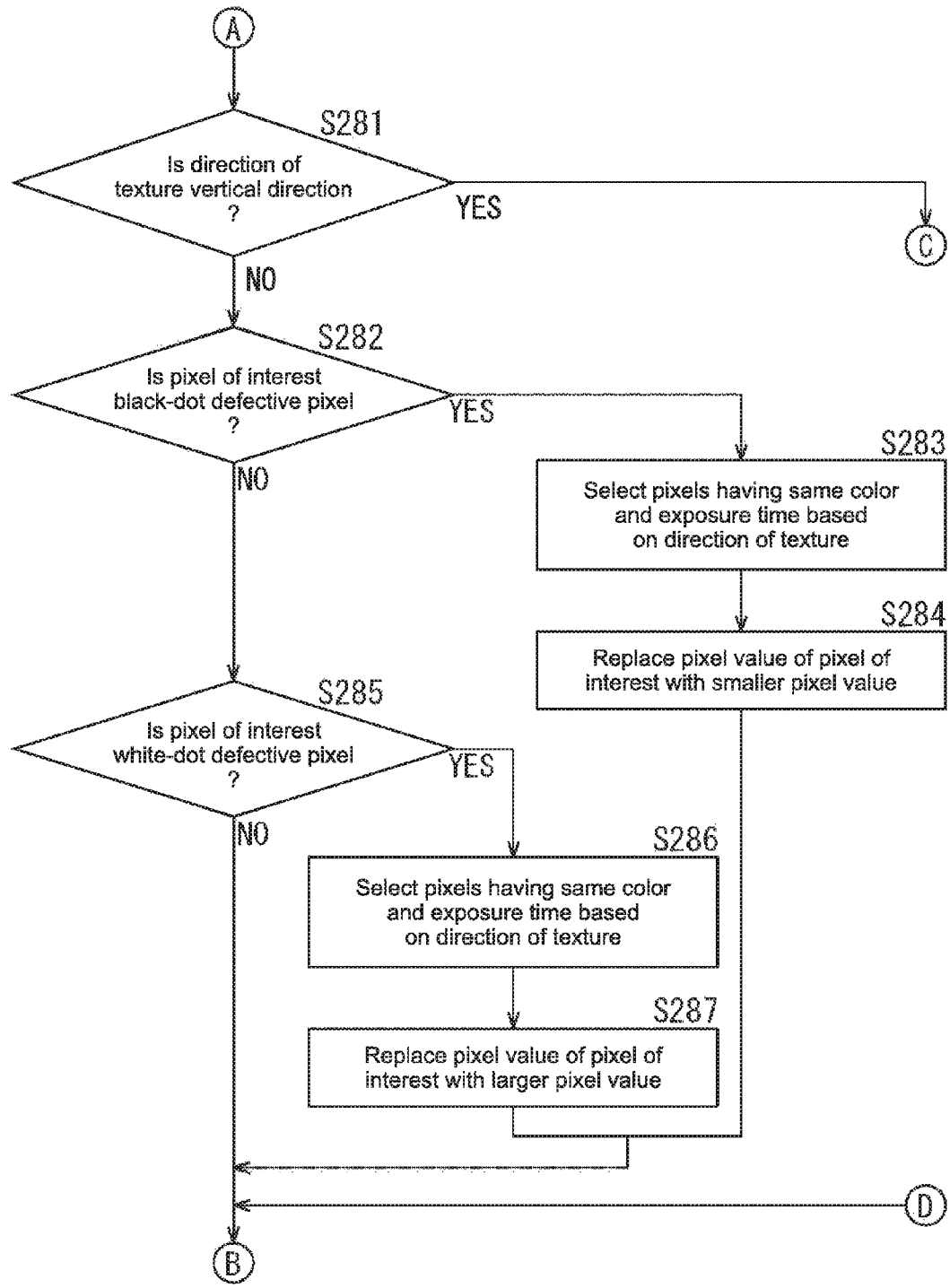
FIG. 30 is a flowchart for describing the example of the defect correction processing in the saturated and non-flat state.

On the other hand, in Step S261, in the case where the defect correcting unit 46 determines that the pixel of interest is not a G pixel (specifically, the pixel of interest is an R or B pixel), the processing proceeds to Step S281 of FIG. 30.

In Step S281, the defect correcting unit 46 determines whether the direction of the texture detected in the processing of Step S214 is the vertical direction or not. In the case where the defect correcting unit 46 determines that the direction of the texture is not the vertical direction, the processing proceeds to Step S282.

In Step S282, the defect correcting unit 46 determines whether the pixel of interest is a black-dot defective pixel or not. In the case where the defect correcting unit 46 determines that the pixel of interest is a black-dot defective pixel, the processing proceeds to Step S283.

In Step S283, the defect correcting unit 46 selects pixels having the same color and exposure time as the pixel of interest based on the direction of the texture detected in the processing of Step S214.

In Step S284, the defect correcting unit 46 replaces the pixel value of the pixel of interest with a smaller one of the pixel values of the pixels selected in the processing of Step S283.

On the other hand, in Step S282, in the case where the defect correcting unit 46 determines that the pixel of interest is not a black-dot defective pixel, the processing proceeds to Step S285.

In Step S285, the defect correcting unit 46 determines whether the pixel of interest is a white-dot defective pixel or not. In the case where the defect correcting unit 46 determines that the pixel of interest is a white-dot defective pixel, the processing proceeds to Step S286.

In Step S286, the defect correcting unit 46 selects pixels having the same color and exposure time as the pixel of interest based on the direction of the texture detected in the processing of Step S214.

In Step S287, the defect correcting unit 46 replaces the pixel value of the pixel of interest with a larger one of the pixel values of the pixels selected in the processing of Step S286.

In the processing of Steps S282 to S287, for example, in the case where the direction of the texture is the +45° direction, the $R_2$ and the $R_5$ of FIG. 14 are selected. In the case where the direction of the texture is the −45° direction, the $R_0$ and the $R_7$ of FIG. 14 are selected.

In the case where the direction of the texture is the horizontal direction, the $R_3$ and the $R_4$ of FIG. 14 are selected. In the uniform exposure array, a pixel that is closest to the pixel of interest in the horizontal direction and has the same color as the pixel of interest is a pixel having exposure time that is different from the exposure time of the pixel of interest. So, it is necessary to select pixels from a direction detection area formed of 45 (=9×5) pixels, which is obtained by further expanding the direction detection area formed of 35 (=7×5) pixels.

In the case where the pixel of interest is a black-dot defective pixel, the pixel value of the pixel of interest is replaced with a smaller one of the pixel values of the selected pixels. In the case where the pixel of interest is a white-dot defective pixel, the pixel value of the pixel of interest is replaced with a larger one of the pixel values of the selected pixels.

Figure 31:
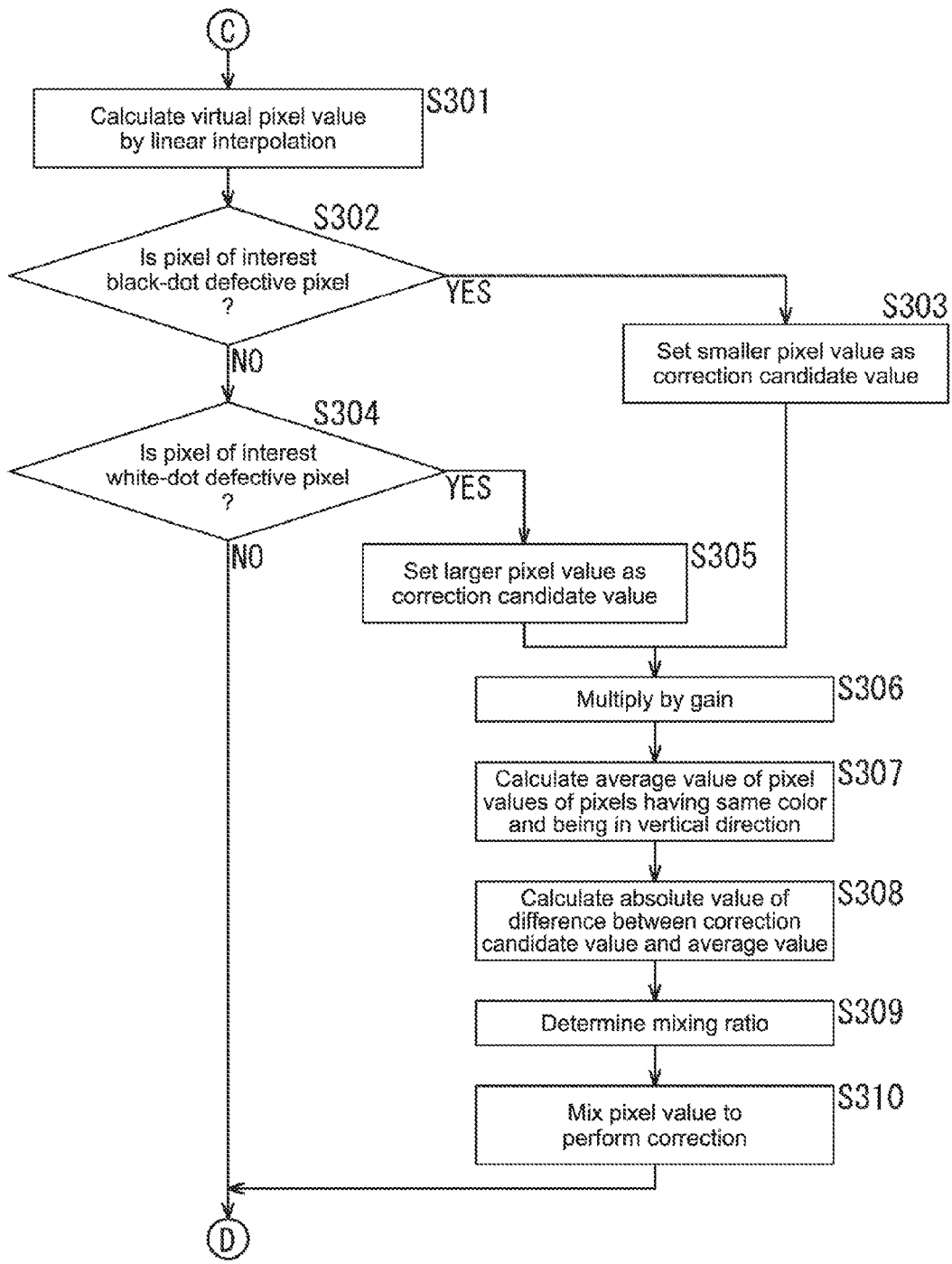
FIG. 31 is a flowchart for describing the example of the defect correction processing in the saturated and non-flat state.

On the other hand, in Step S281, in the case where the defect correcting unit 46 determines that the direction of the texture is the vertical direction, the processing proceeds to Step S301 of FIG. 31.

In Step S301, the defect correcting unit 46 calculates pixel values of virtual pixels by linear interpolation.

Specifically, in the case where the direction of the texture is the vertical direction, the pixel values of pixels at two positions in the vertical direction are calculated by linear interpolation. For example, a virtual pixel value having a pixel value calculated as $(R_0+R_2)/2$ in FIG. 14 and a virtual pixel value having a pixel value calculated as $(R_5+R_7)/2$ are calculated. This is because, in the uniform exposure array, pixels having the same color and exposure time do not exist in the vertical direction in the area corresponding to five rows.

In Step S302, the defect correcting unit 46 determines whether the pixel of interest is a black-dot defective pixel or not. In the case where the defect correcting unit 46 determines that the pixel of interest is a black-dot defective pixel, the processing proceeds to Step S303.

In Step S303, the defect correcting unit 46 sets a smaller one of the virtual pixel values calculated in the processing of Step S301 as a correction candidate value.

On the other hand, in Step S302, in the case where the defect correcting unit 46 determines that the pixel of interest is not a black-dot defective pixel, the processing proceeds to Step S304.

In Step S304, the defect correcting unit 46 determines whether the pixel of interest is a white-dot defective pixel or not. In the case where the defect correcting unit 46 determines that the pixel of interest is a white-dot defective pixel, the processing proceeds to Step S305.

In Step S305, the defect correcting unit 46 sets a larger one of the virtual pixel values calculated in the processing of Step S301 as a correction candidate value.

In Step S306, for the correction candidate value obtained in Step S303 or S305, the pixel value of the short-time exposure pixel is corrected by being multiplied by a gain obtained by (exposure time of long-time exposure pixel/ exposure time of short-time exposure pixel).

In Step S307, the defect correcting unit 46 calculates an average value of the pixel values of the pixels having the same color as the pixel of interest and being in the vertical direction. For example, in the case of FIG. 14, $(R_1+R_6)/2$ is calculated. It should be noted that the $R_1$ and the $R_6$ are the pixel values of the virtual pixels calculated by the linear interpolation.

In Step S308, the defect correcting unit 46 calculates an absolute value of a difference between the correction candidate value obtained in Step S303 or S305 and the average value obtained in Step S307.

In Step S309, the defect correcting unit 46 determines a mixing ratio when the pixel value of the pixel of interest is mixed to the correction candidate value, based on the absolute value of the difference obtained in Step S308.

At that time, the mixing ratio is determined as described above with reference to FIG. 15, for example.

In Step S310, the defect correcting unit 46 mixes the pixel value of the pixel of interest to the correction candidate value, based on the mixing ratio obtained in Step S309, to correct the pixel value of the pixel of interest.

In such a manner, the defect correction processing in the saturated and non-flat state is executed.

As described above, the defect correction processing in the uniform exposure array is executed.

In the above description, the example in which the embodiment of the present disclosure is applied to an image sensor that obtains an image in a high dynamic range by changing an exposure time in accordance with the position of a pixel in the pixel array of the Bayer array, the image in the high dynamic range being appropriately displayed from the pixels of low luminance to the pixels of high luminance. However, the embodiment of the present disclosure is also applicable to an image sensor that obtains an image in a high dynamic range by changing a light sensitivity in accordance with the position of a pixel in the pixel array of the Bayer array, the image in the high dynamic range being appropriately displayed from the pixels of low luminance to the pixels of high luminance.

Further, the image sensor to which the embodiment of the present disclosure is applied is not necessarily limited to the image sensor having the pixel array of the Bayer array.

Figure 32:
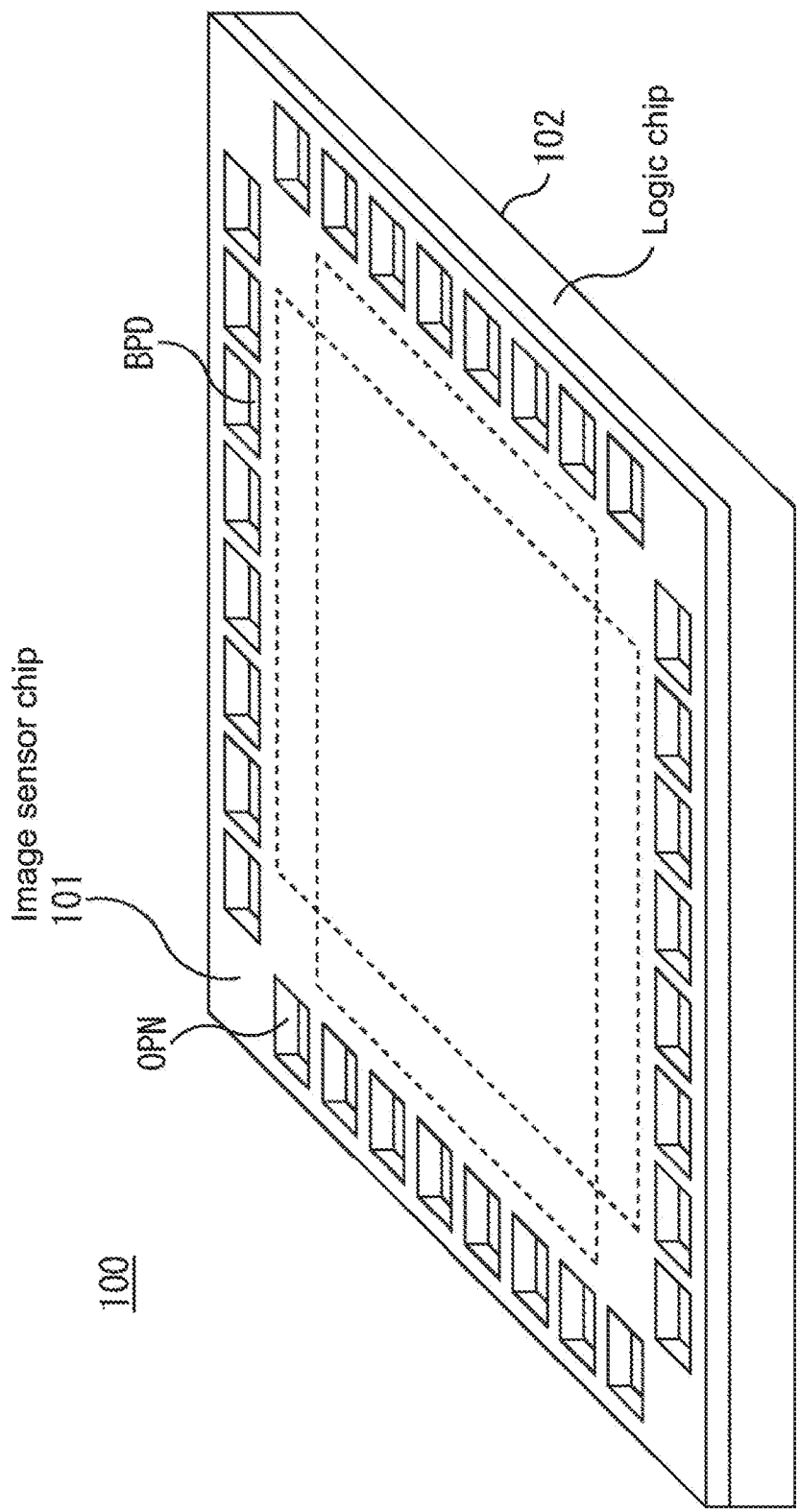
FIG. 32 is a diagram showing a configuration example of a solid-state imaging device serving as a semiconductor device according to the embodiment of the present disclosure.

FIG. 32 is a diagram showing a configuration example of a solid-state imaging device serving as a semiconductor device according to the embodiment of the present disclosure. In FIG. 32, a solid-state imaging device 100 is an image sensor that adopts an SVE (Spatially Varying Exposure) method, for example, and is constituted as an image sensor 100 that can execute the processing described above with reference to FIGS. 17 to 31.

As shown in FIG. 32, the image sensor 100 has a laminate structure including a first chip (upper chip) 101 and a second chip (lower chip) 102. The image sensor 100 is formed as a solid-state imaging device having the laminate structure that is obtained after wafer bonding and cutting-out by singulation, as will be described later.

In the laminate structure of the two upper and lower chips, for example, the first chip 101 is constituted as an image sensor chip, and the second chip 102 is constituted as a logic chip including a control circuit and an image processing circuit for the first chip.

Bonding pads BPD and input and output circuits are formed in the second chip (lower chip) 102. Openings OPN for wire bonding of the second chip 102 are formed in the first chip (upper chip).

On the upper side of the image sensor 100 in FIG. 32 and at the center of the first chip 101, a pixel array in which the short-time exposure pixels and the long-time exposure pixels are disposed in the row exposure array or the uniform exposure array is formed.

In the second chip (lower chip) 102, the circuits for achieving the function of the image processing device 10 shown in FIG. 3, and the like are formed.

Figure 33:
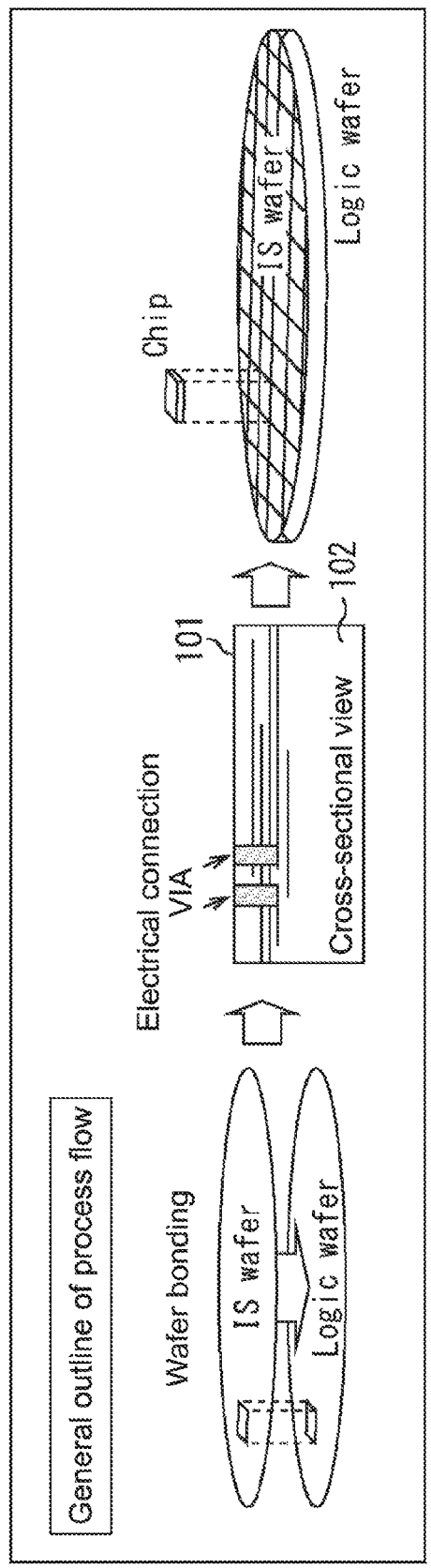
FIG. 33 is a diagram for describing a process flow of an image sensor having a laminate structure according to the embodiment of the present disclosure.

FIG. 33 is a diagram for describing a process flow of the image sensor having the laminate structure according to this embodiment.

As shown in the left part of FIG. 33, wafers in which upper and lower chips are manufactured by respective optimal processes are bonded to each other. Subsequently, the back surface of the upper chip is polished, and the wafer thickness of the upper chip is reduced. After patterning is performed on the first chip (upper chip) 101, through-holes are formed to penetrate from the first chip 101 to a wiring layer of the second chip (lower chip) 102 and embedded with metal to form vias.

As shown in the center part of FIG. 33, signal lines and power-supply lines between the upper and lower chips are electrically connected through those vias.

As shown in the right part of FIG. 33, after processing of color filters and microlenses is performed on the first chip (upper chip) 101, chips are cut out by singulation.

Figure 34:
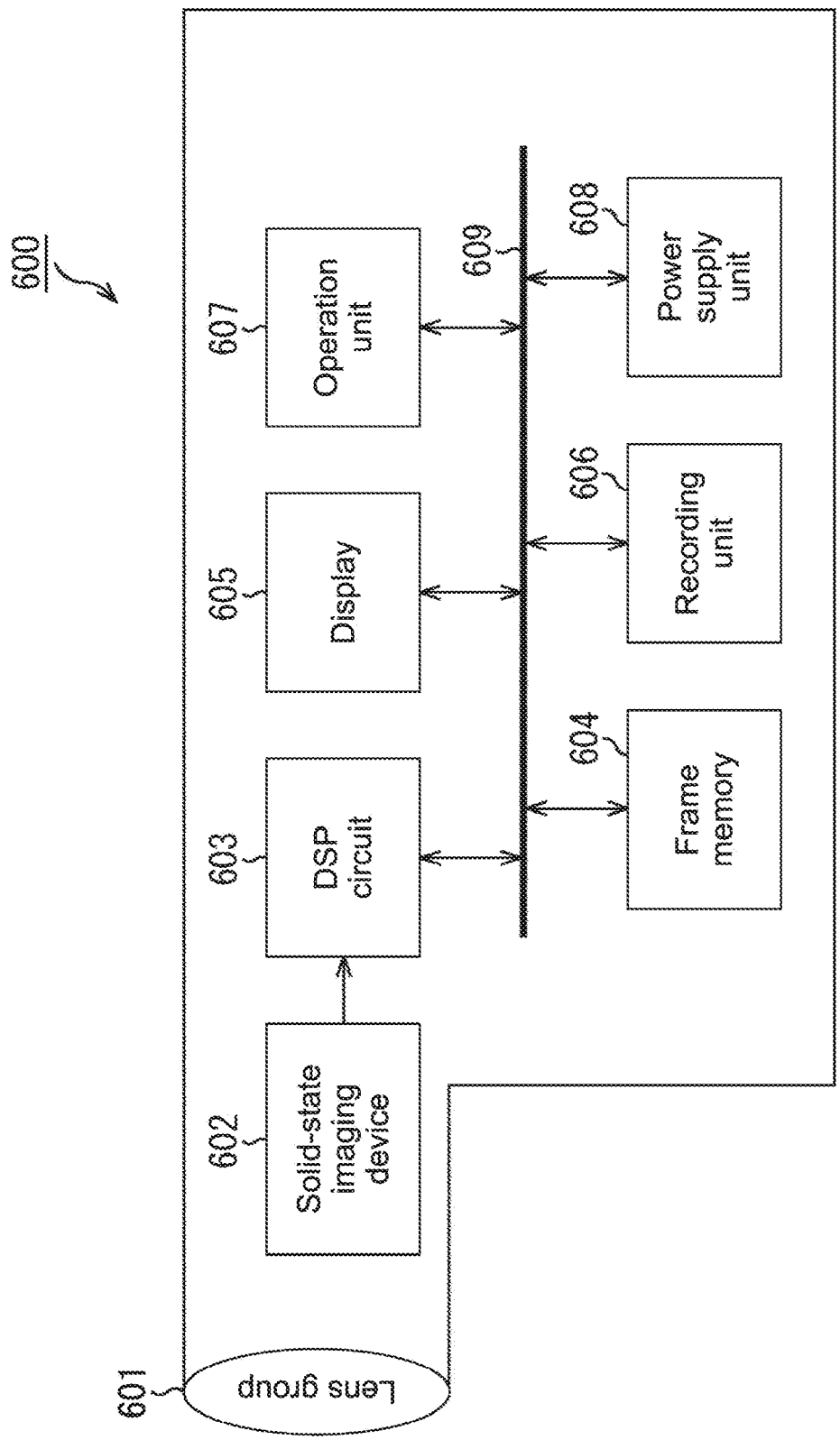
FIG. 34 is a block diagram showing a configuration example of the imaging apparatus serving as an electronic apparatus to which the embodiment of the present disclosure is applied.

FIG. 34 is a block diagram showing a configuration example of an imaging apparatus serving as an electronic apparatus to which the embodiment of the present disclosure is applied.

An imaging apparatus 600 of FIG. 34 includes an optical unit 601 constituted of a lens group and the like, a solid-state imaging device (imaging device) 602, and a DSP (Digital Signal Processing) circuit 603 serving as a camera signal processing circuit. Further, the imaging apparatus 600 includes a frame memory 604, a display 605, a recording unit 606, an operation unit 607, and a power supply unit 608. The DSP circuit 603, the frame memory 604, the display 605, the recording unit 606, the operation unit 607, and the power supply unit 608 are connected to one another via a bus line 609.

The optical unit 601 takes in incident light coming from a subject, i.e., an image light, and forms an image on an imaging surface of the solid-state imaging device 602. The solid-state imaging device 602 converts the amount of incident light, with which the image is formed on the imaging surface by the optical unit 601, into an electrical signal on a pixel-by-pixel basis. The solid-state imaging device 602 subsequently outputs the electrical signal as a pixel signal. A solid-state imaging device such as the image sensor 100 according to the embodiment described above can be used as the solid-state imaging device 602.

The display 605 is formed of a panel display such as a liquid crystal panel or an organic EL (Electro Luminescence) panel and displays moving images or still images captured by the solid-state imaging device 602. The recording unit 606 records the moving images or still images captured by the solid-state imaging device 602 on a recording medium such as a video tape and a DVD (Digital Versatile Disk).

The operation unit 607 issues operation commands on various functions of the imaging apparatus 600 under the operation of a user. The power supply unit 608 supplies various types of power, which serves as operation power of the DSP circuit 603, the frame memory 604, the display 605, the recording unit 606, and the operation unit 607, to those supply targets as appropriate.

Further, the embodiment of the present disclosure is not limited to be applied to the solid-state imaging device that detects the distribution of the amount of incident visible light and captures the distribution as an image. The embodiment of the present disclosure is applicable to a solid-state imaging device that captures the distribution of the incident light amount of infrared rays or X rays or the distribution of particles or the like as an image, or applicable to, in a broader sense, all solid-state imaging devices (physical quantity distribution detecting device) including a fingerprint detection sensor that detects the distribution of another physical quantity such as a pressure and an electrostatic capacitance and captures an image of the distribution.

Furthermore, the embodiment of the present disclosure is not limited to the embodiment described above and can be variously modified without departing from the gist of the present disclosure.

It should be noted that the present disclosure can have the following configurations.

(1) A solid-state imaging device, including:
a pixel array including a plurality of pixels, the plurality of pixels each having one of a different exposure time and a different exposure sensitivity and being disposed according to a predetermined rule; and
a pixel value correcting unit configured to correct, among pixel values obtained from the plurality of pixels in the pixel array, a pixel value of a pixel of the plurality of pixels that applies to a preset condition, by using a pixel value of another pixel of the plurality of pixels.

(2) The solid-state imaging device according to (1), in which
the pixel array includes the plurality of pixels each having one of the same exposure time and the same exposure sensitivity and being regularly disposed on a row-by-row basis.

(3) The solid-state imaging device according to (1), in which the pixel array includes the plurality of pixels including a predetermined number of pixels each having one of the same exposure time and the same exposure sensitivity and being regularly disposed as an L-shaped group of pixels.

(4) The solid-state imaging device according to any one of (1) to (3), in which
the pixel value correcting unit is configured to set a pixel of interest in the plurality of pixels disposed in the pixel array to be the center of the pixel array, extract a processing unit area including a preset number of rows of pixels, and correct the pixel value of the pixel of interest for each processing unit area.

(5) The solid-state imaging device according to (4), in which
the processing unit area includes five rows.

(6) The solid-state imaging device according to (4), in which
the pixel value correcting unit includes
a saturation determining unit configured to determine whether the processing unit area is saturated or not based on the number of pixels that output a maximum pixel value among the pixels of the processing unit area,
a flatness determining unit configured to determine whether or not an image formed of the pixels of the processing unit area is a flat image that is free from a texture,
a direction detecting unit configured to detect a direction of the texture when it is determined that the image formed of the pixels of the processing unit area is not a flat image,
a defect determining unit configured to determine whether the pixel of interest is a defective pixel or not, and
a defect correcting unit configured to correct the pixel value of the pixel of interest when it is determined that the pixel of interest is a defective pixel.

(7) The solid-state imaging device according to (6), in which
in accordance with a result of the determination by the saturation determining unit, the flatness determining unit is configured to determine whether the image is a flat image or not, and the direction detecting unit is configured to detect the direction of the texture, by different methods.

(8) The solid-state imaging device according to (7), in which
in accordance with a result of the determination by the flatness determining unit, the defect determining unit is configured to determine whether the pixel of interest is a defective pixel or not, and the defect correcting unit is configured to correct the pixel value of the pixel of interest, by different methods.

(9) The solid-state imaging device according to (8), in which
the defect correcting unit is configured to correct the pixel value of the pixel of interest by replacing the pixel value of the pixel of interest with a pixel value of a pixel selected based on the detected direction of the texture, when it is determined that the image formed of the pixels of the processing unit area is not a flat image.

(10) The solid-state imaging device according to (9), in which
in the case where the pixel array includes the plurality of pixels including a predetermined number of pixels each having one of the same exposure time and the same exposure sensitivity and being regularly disposed as an L-shaped group of pixels, and when the detected direction of the texture is a vertical direction, the defect correcting unit is configured to generate the pixel value of the pixel selected based on the direction of the texture by linear interpolation.

(11) The solid-state imaging device according to (10), in which the defect correcting unit is configured to mix the pixel value generated by the linear interpolation and the pixel value of the pixel of interest, based on a mixing ratio determined based on the pixel value generated by the linear interpolation.

(12) The solid-state imaging device according to (6), further including a gain adding unit configured to multiply, among the pixels of the processing unit area, a pixel value of a pixel having one of a first exposure time and a first exposure sensitivity by a predetermined gain, to thereby normalize the pixel values of the pixels of the processing unit area, with a pixel value of a pixel having one of a second exposure time and a second exposure sensitivity being as a reference.

(13) The solid-state imaging device according to any one of (1) to (12), in which the solid-state imaging device includes a lamination-type image sensor including a first chip on which the pixel array is disposed, and a second chip including a circuit for achieving a function of the pixel value correcting unit.

(14) A solid-state imaging method, including correcting, among pixel values obtained from a plurality of pixels in a pixel array, a pixel value of a pixel of the plurality of pixels that applies to a preset condition, by using a pixel value of another pixel of the plurality of pixels, the plurality of pixels each having one of a different exposure time and a different exposure sensitivity and being disposed according to a predetermined rule.

(15) An electronic apparatus, including a solid-state imaging device including a pixel array including a plurality of pixels, the plurality of pixels each having one of a different exposure time and a different exposure sensitivity and being disposed according to a predetermined rule, and a pixel value correcting unit configured to correct, among pixel values obtained from the plurality of pixels in the pixel array, a pixel value of a pixel of the plurality of pixels that applies to a preset condition, by using a pixel value of another pixel of the plurality of pixels.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
a pixel array including first pixels and second pixels, the first pixels having a first exposure time and the second pixels having a second exposure time,
wherein the second exposure time is shorter than the first exposure time,
wherein a first line of the pixel array includes a first pixel set having an uninterrupted sequence of one first pixel and three second pixels in a row, and
wherein a second line of the pixel array includes a second pixel set having an uninterrupted sequence of one second pixel and three first pixels in a row.

2. The imaging device according to claim 1, further comprising:
a pixel value correcting unit configured to correct a pixel value of a pixel of the first pixels by using a pixel value of another pixel of the first pixels.

3. The imaging device according to claim 1, wherein the one first pixel of the first pixel set is in a first column of the pixel array, and wherein the one second pixel of the second pixel set is in a second column of the pixel array.

4. The imaging device according to claim 3, wherein a third line of the pixel array includes a third pixel set having one first pixel and three second pixels in a row.

5. The imaging device according to claim 4, wherein the one first pixel of the third pixel set is in a third column of the pixel array.

6. The imaging device according to claim 5, wherein the one first pixel of the first pixel set has a first color, and wherein the one first pixel of the third pixel set has the first color.

7. The imaging device according to claim 6, wherein the three first pixels of the second pixel set do not have the first color.

8. The imaging device according to claim 7, wherein the three second pixels of the first pixel set have the first color or a second color.

9. The imaging device according to claim 8, wherein the three first pixels of the second pixel set have the second color or a third color.

10. The imaging device according to claim 9, wherein the one second pixel of the second pixel set has the third color.

11. The imaging device according to claim 1, wherein one of the second pixels of the first pixel set is adjacent to the one second pixel of the second pixel set.

12. The imaging device according to claim 3, wherein the second column is adjacent to the first column.

13. The imaging device according to claim 1, wherein the one first pixel of the first pixel set has a first color, and wherein the three first pixels of the second pixel set do not have the first color.

14. The imaging device according to claim 13, wherein the three second pixels of the first pixel set have the first color or a second color.

15. The imaging device according to claim 14, wherein the three first pixels of the second pixel set have the second color or a third color.

16. The imaging device according to claim 15, wherein the one second pixel of the second pixel set has the third color.

* * * * *